US009021435B2

(12) United States Patent
Pletter et al.

(10) Patent No.: US 9,021,435 B2
(45) Date of Patent: Apr. 28, 2015

(54) METHODS AND SYSTEMS FOR PROVIDING A USER INTERFACE IN A MULTI-TENANT DATABASE ENVIRONMENT

(75) Inventors: Daniel L. Pletter, San Francisco, CA (US); Andrew Waite, Novato, CA (US); Doug Chasman, Pittsford, NY (US); James K. Mooney, San Francisco, CA (US); James Troup, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 362 days.

(21) Appl. No.: 12/970,686

(22) Filed: Dec. 16, 2010

(65) Prior Publication Data

US 2011/0289479 A1   Nov. 24, 2011

Related U.S. Application Data

(60) Provisional application No. 61/353,284, filed on Jun. 10, 2010, provisional application No. 61/346,625, filed on May 20, 2010, provisional application No. 61/354,001, filed on Jun. 11, 2010.

(51) Int. Cl.
   *G06F 9/44*     (2006.01)
   *G06F 17/30*    (2006.01)
   *G06F 17/22*    (2006.01)

(52) U.S. Cl.
   CPC ...... *G06F 17/30575* (2013.01); *G06F 17/2247* (2013.01); *G06F 8/38* (2013.01)

(58) Field of Classification Search
   USPC .......................................................... 707/171
   See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,675,801 A | 10/1997 | Lindsey |
| 5,682,507 A | 10/1997 | Phillips et al. |
| 5,715,450 A | 2/1998 | Ambrose et al. |
| 5,761,419 A | 6/1998 | Schwartz et al. |

(Continued)

OTHER PUBLICATIONS

OWL 2 Web Ontology Language XML Serialization, Published 2009 (http://www.w3.org/TR/2009/REC-owl2-xml-serialization-20091027/).*

(Continued)

*Primary Examiner* — Don Wong
*Assistant Examiner* — Deric Ortiz
(74) *Attorney, Agent, or Firm* — Weaver Austin Villeneuve & Sampson LLP

(57) ABSTRACT

Methods, devices and systems for providing a user interface in an on-demand software service environment are described. Some implementations involve receiving an indication of a component definition to instantiate. The component definition may be a portion of a component definition data structure. Such implementations may also involve instantiating the provided component, instantiating all remaining attributes of the component definition data structure to produce a component instance data structure and transmitting an intermediate representation of the indicated component to a client device. The intermediate representation may comprise a version of the component instance data structure. The intermediate representation may allow the client device to create an instance of the component in memory.

22 Claims, 11 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,945,989 A | 8/1999 | Freishtat et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,917,930 B1 | 7/2005 | Brodale et al. |
| 6,941,521 B2 | 9/2005 | Lin et al. |
| 7,062,502 B1 | 6/2006 | Kesler |
| 7,080,119 B2 | 7/2006 | Felt et al. |
| 7,100,111 B2 | 8/2006 | McElfresh et al. |
| 7,181,758 B1 | 2/2007 | Chan |
| 7,197,715 B1 | 3/2007 | Valeria |
| 7,219,305 B2 * | 5/2007 | Jennings .................. 715/761 |
| 7,222,148 B2 | 5/2007 | Potter et al. |
| 7,269,590 B2 | 9/2007 | Hull et al. |
| 7,289,976 B2 | 10/2007 | Kihneman et al. |
| 7,293,009 B2 | 11/2007 | Jacobs et al. |
| 7,293,038 B2 | 11/2007 | Blevins et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,441,200 B2 | 10/2008 | Savage |
| 7,454,509 B2 | 11/2008 | Boulter et al. |
| 7,508,789 B2 | 3/2009 | Chan |
| 7,554,544 B2 | 6/2009 | MacLaurin |
| 7,599,935 B2 | 10/2009 | La Rotonda et al. |
| 7,603,331 B2 | 10/2009 | Tuzhilin et al. |
| 7,610,548 B1 | 10/2009 | Brinkman et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,881 B1 | 12/2010 | Assal et al. |
| 7,895,315 B2 | 2/2011 | Weinrich et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven al. |
| 8,402,438 B1 | 3/2013 | Andrews et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,792 B2 | 10/2013 | Chasman et al. |
| 8,646,103 B2 | 2/2014 | Jakobson et al. |
| 2001/0044791 A1 | 11/2001 | Richter et al. |
| 2002/0049749 A1 | 4/2002 | Helgeson et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |

(56) References Cited

U.S. PATENT DOCUMENTS

| | | |
|---|---|---|
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0015748 A1 | 1/2005 | Zatloukal |
| 2005/0028105 A1 | 2/2005 | Musson et al. |
| 2005/0050555 A1 | 3/2005 | Exley et al. |
| 2005/0091098 A1 | 4/2005 | Brodersen et al. |
| 2005/0108647 A1 | 5/2005 | Musson et al. |
| 2006/0047780 A1* | 3/2006 | Patnude ............... 709/219 |
| 2007/0079282 A1 | 4/2007 | Nachnani et al. |
| 2008/0092057 A1 | 4/2008 | Monson et al. |
| 2008/0155613 A1 | 6/2008 | Benya et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0083172 A1 | 4/2010 | Breeds et al. |
| 2010/0185862 A1 | 7/2010 | Moore et al. |
| 2010/0275117 A1 | 10/2010 | Vion-Dury et al. |
| 2011/0276946 A1 | 11/2011 | Pletter |
| 2011/0283355 A1* | 11/2011 | Livshits et al. ............ 726/22 |
| 2011/0289140 A1 | 11/2011 | Pletter et al. |
| 2011/0289141 A1 | 11/2011 | Pletter et al. |
| 2011/0289425 A1 | 11/2011 | Pletter et al. |
| 2011/0289476 A1 | 11/2011 | Pletter et al. |
| 2012/0233137 A1 | 9/2012 | Jakobson et al. |
| 2012/0290407 A1 | 11/2012 | Hubbard et al. |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

U.S. Office Action dated Nov. 13, 2012 issued in U.S. Appl. No. 12/970,704.
U.S. Final Office Action dated Apr. 4, 2013 in U.S. Appl. No. 12/970,704.
U.S. Office Action dated Mar. 14, 2013 in U.S. Appl. No. 12/970,725.
"Google Plus Users", Google+Ripples, Oct. 31, 2011 [retrieved on Feb. 21, 2012 from Internet at http://www.googleplusers.com/google-ripples.html], 3 pages.
U.S. Office Action dated Sep. 11, 2013 in U.S. Appl. No. 12/970,652.
U.S. Office Action dated May 22, 2013 issued in U.S. Appl. No. 12/970,666.
U.S. Final Office Action dated Nov. 5, 2013 issued in U.S. Appl. No. 12/970,666.
U.S. Office Action dated Sep. 10, 2013 issued in U.S. Appl. No. 12/970,704.
U.S. Final Office Action dated Sep. 9, 2013 issued in U.S. Appl. No. 12/970,725.
U.S. Final Office Action dated May 5, 2014 in U.S. Appl. No. 12/970,652.
U.S. Office Action dated Mar. 27, 2014 issued in U.S. Appl. No. 12/970,666.
U.S. Final Office Action dated Feb. 27, 2014 issued in U.S. Appl. No. 12/970,704.
U.S. Office Action dated May 9, 2014 in U.S. Appl. No. 12/970,725.

* cited by examiner

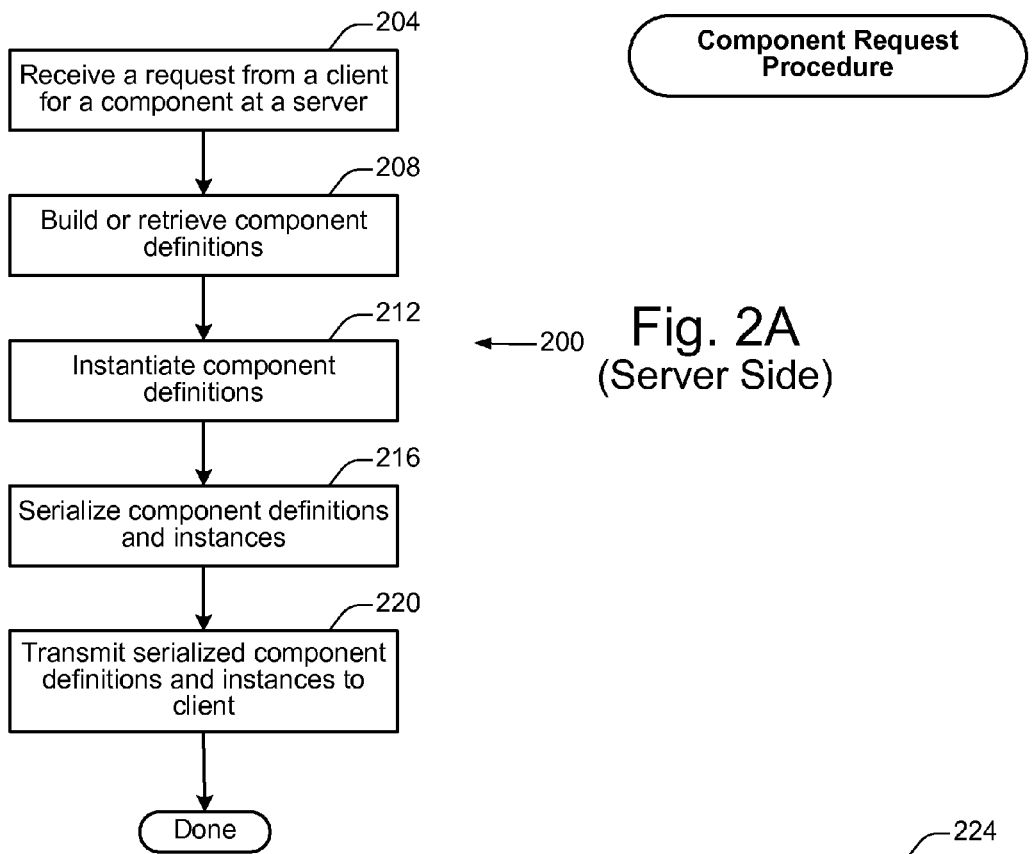
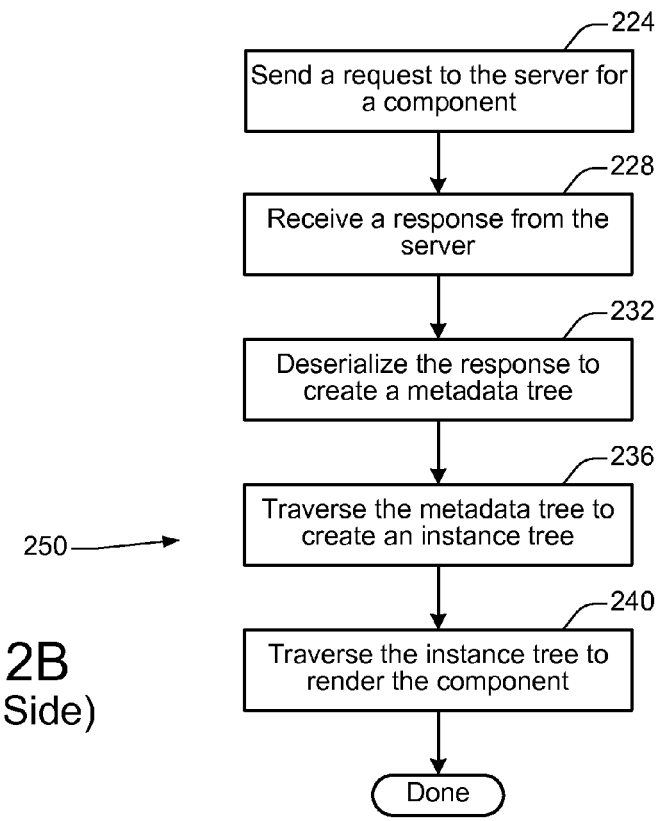

METHODS AND SYSTEMS FOR PROVIDING A USER INTERFACE IN A MULTI-TENANT DATABASE ENVIRONMENT

PRIORITY CLAIMS

This application also claims priority to U.S. Provisional Patent Application No. 61/353,284, entitled "Methods and Systems for Providing Custom JSON Handlers and Tools in a Multi-Tenant Database System" and filed on Jun. 10, 2010, which is hereby incorporated by reference and for all purposes.

This application claims priority to U.S. Provisional Patent Application No. 61/346,625, entitled "Methods and Systems for Rendering a User Interface in a Multitenant Database Environment" and filed on May 20, 2010, which is hereby incorporated by reference and for all purposes.

This application also claims priority to U.S. Provisional Patent Application No. 61/354,001, entitled "Methods and Systems for Reducing the Number of Definitions Residing in the Memory of a Multi-Tenant Database System" and filed on Jun. 11, 2010, which is hereby incorporated by reference and for all purposes.

CROSS-REFERENCE TO RELATED APPLICATIONS

This application is related to U.S. patent application Ser. No. 12/970,652, entitled "Methods and Systems for Providing a User Interface in a Multi-Tenant Database Environment" and filed on Dec. 16, 2010, and is also related to U.S. patent application Ser. No. 12/970,666, entitled "Methods and Systems for Providing a User Interface in a Multi-Tenant Database Environment" and filed on Dec. 16, 2010, and is also related to U.S. patent application Ser. No. 12/970,704, entitled "Methods and Systems for Providing a User Interface in a Multi-Tenant Database Environment" and filed on Dec. 16, 2010, and is also related to U.S. patent application Ser. No. 12/970,725, entitled "Methods and Systems for Providing a User Interface in a Multi-Tenant Database Environment" and filed on Dec. 16, 2010, all of which are hereby incorporated by reference and for all purposes.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

FIELD OF THE APPLICATION

Some of the subject matter described herein involves user interface ("UI") frameworks.

BACKGROUND

In the past, most UI frameworks were controlled primarily on the server side. On the client side, the browser would render web pages that were handed down by the server. There is increasing customer demand for a "long lasting page" and related functionality. (As used herein, the term "page" may refer to a user interface, usually but not necessarily on the client side.) A user may view a long-lasting page for an hour or for the entire day, instead of viewing the page for a small amount of time (such as a minute). With a long lasting page, the user can manipulate the page. The data that the user is looking at may change over time. New components may become part of the page, whereas prior components may no longer be part of the page. Still other components may be modified.

BRIEF DESCRIPTION OF THE DRAWINGS

FIG. 2A depicts one example of a process of processing client requests for a component.

FIG. 2B depicts one example of a process of making a client request for a component and of processing the results returned by a server.

DETAILED DESCRIPTION

Figure 1:
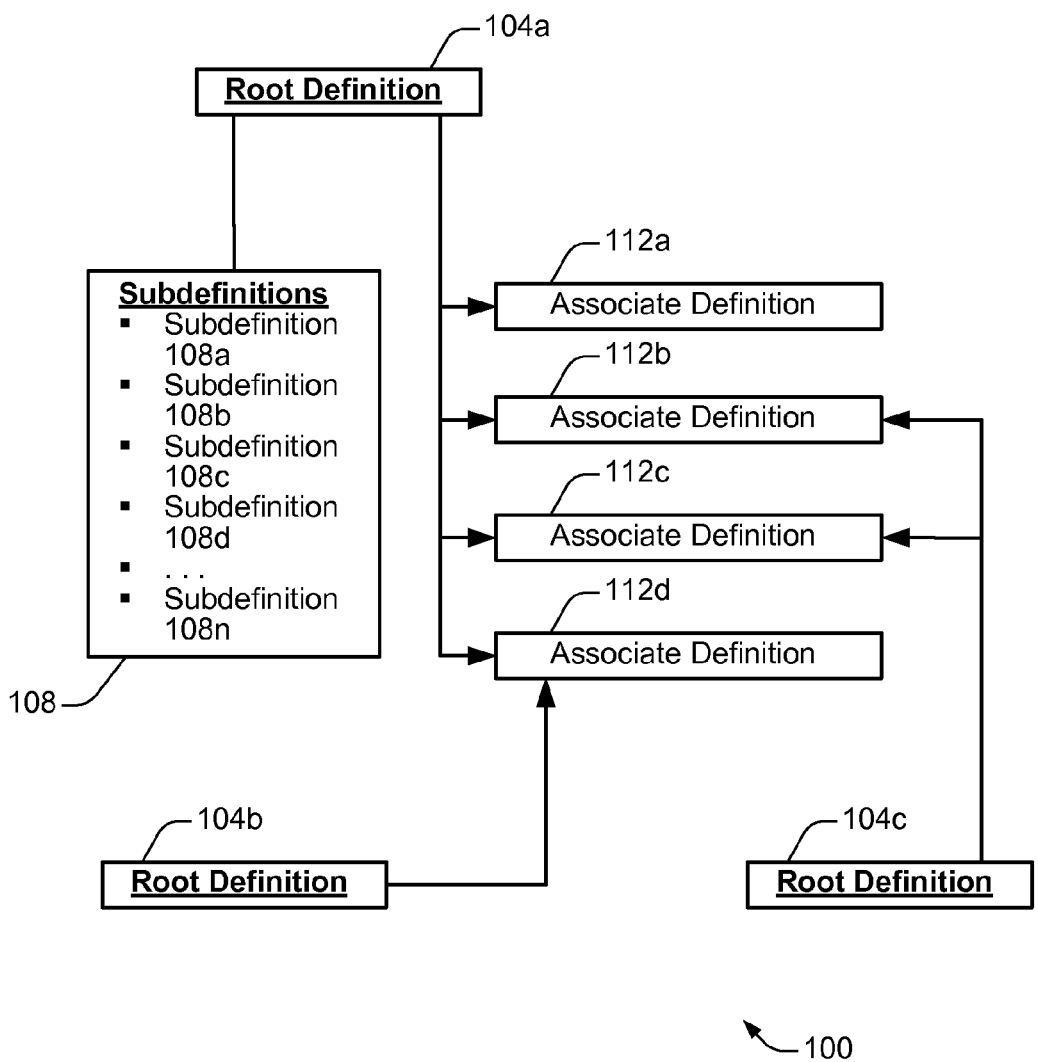
FIG. 1 provides examples of definition and subdefinition structures.

While the present invention will be described with reference to a few specific embodiments, the description and specific embodiments are merely illustrative of the invention and are not to be construed as limiting. Various modifications can be made to the described embodiments. For example, the steps of methods shown and described herein are not necessarily performed in the order indicated. It should also be understood that the methods shown and described herein may include more or fewer steps than are indicated. In some implementations, steps described herein as separate steps may be combined. Conversely, what may be described herein as a single step may be implemented as multiple steps.

Similarly, device functionality may be apportioned by grouping or dividing tasks in any convenient fashion. For example, when steps are described herein as being performed by a single device (e.g., by a single server or a single controller), the steps may alternatively be performed by multiple devices and vice versa.

Overview

Various embodiments described herein provide improved UI frameworks suitable for a multi-tenant database system. As used herein, the terms "multi-tenant database system" "multi-tenant database environment," etc., refer to those systems in which various elements of hardware and software of the database system may be shared by one or more customers. For example, a given application server may simultaneously process requests for a great number of customers, and a given database table may store rows for a potentially much greater number of customers.

According to some implementations described herein, tools for developers are provided that allow developers to write software (also referred to herein as "code") that runs on the server side or the client/browser side. Such implementations can give the developers more flexibility and may provide a similar number of tools and similar kinds of tools for the browser side and for the server side. If the developer wants to write relatively complex code for execution on the server side, the client side or both, the developer may do so using the same framework.

According to some such implementations, code may be written in different languages using the same framework. For example, a developer could write code for execution on the server side using Java™, Apex™ (a Salesforce™ proprietary language), or some other language. The developer may choose to write code for execution on the on the client side using another language, such as JavaScript™. The framework may be configured to determine what will be executed on the server side and what will be executed on the client side, and may be configured to control communications between the client and server accordingly. In some embodiments, the language in which code is written in will determine whether the code will be run on the client side or the server side.

In some embodiments, data and metadata may be prepared on the server side, in response to a request from the client. For example, the components themselves may be expressed in a markup language, such as Extensible Markup Language ("XML"). There may be representations of the components on the server and on the client. A server may compile the XML into a component tree, e.g., as a Java object. Some embodiments provided herein allow for the instantiation of abstract components. According to some such embodiments, there is no need to create a separate factory or some other code to instantiate a non-concrete component as each concrete component type.

Instead of receiving a markup language such as HyperText Markup Language ("HTML"), the client may receive an intermediate form of code that it can use for the page rendering process. For example, the client may receive JavaScript Object Notation ("JSON") structures as input and may re-create the component tree in JavaScript. In alternative embodiments, the client may receive another type of code, such as XML, JavaScript or Cascading Style Sheets ("CSS"). User interfaces may be rendered in a manner that shifts responsibility for rendering HTML elements and control flow from the server side to the client side, e.g., to a JavaScript engine running inside a browser on a client device. Accordingly, rendering may be performed dynamically on the client side.

Some embodiments described herein include a JavaScript bootstrapping engine that may be loaded by the initial page response from the server. That initial page response can provide JSON objects representing the data and elements on the page. These JSON objects may be sufficient to cause the client to render an entire page. Moreover, these JSON objects may be sufficient to initiate the navigation and user workflow in a manner that may not require a traditional server "post-back" under many circumstances.

Some embodiments provide a novel interaction model between the server and the client. The interaction models of other frameworks are generally server-centric or client-centric. In contrast, some implementations described herein provide an event model on the client side that is configured to respond dynamically to user input. According to the event model, a client may respond by changing what is rendered on a page in some way, by communicating with the server to obtain an update, by moving on to an entirely different application, etc. In some such embodiments, data may only be sent between the client and server in certain circumstances or for limited purposes, e.g., for an application programming interface ("API").

Both the client and the server may be working with substantially the same data structure, which may be implemented on both the client side and the server side. However, in some implementations the actual instances of a component may not be retained on the server side after they are serialized down to the client.

These and other aspects of the invention may be implemented by various types of hardware, software, firmware, etc. For example, some features of the invention may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM"). These and other features and benefits of aspects of the application will be described in more detail below with reference to the associated drawings.

Lumen

Some embodiments of the invention may be described herein in the context of an UI framework provided by the current assignee called "Lumen." However, the present invention is not limited to present or future implementations of Lumen.

In some embodiments, Lumen pages (or at least the initial page) may be authored in markup language, e.g., in a manner similar to that of the Visualforce product of the present assignee. However, a different rendering engine may be used by these pages. Formula syntax may be used to bind data between components or to bind to data store fields. Validation may be done at compile time and/or at runtime.

In some embodiments, at runtime the markup may be interpreted by the server to create a server-side representation of the elements on the page as well as the data on the page. However, in some such embodiments neither the elements on the page nor the data on the page will be rendered as HTML. Instead, the response provided by the server to the client may include a JavaScript import (which may be referred to as "Lumen.js") that can provide client-side Lumen functionality.

In some implementations, the response provided by the server will not include HTML. Instead, the page may comprise a large block of JavaScript, the execution of which (e.g., by a browser executing on a client machine) renders the page dynamically. More details are provided below.

In some embodiments, the interpretation of the JavaScript code creates the client-side image of the data stores and component types, as well as the actual component tree and the events that connect components. A user interface may be conceptualized as a set of "events" (such as JavaScript events). When a user interacts with the page on a client device (e.g., by clicking on buttons or other areas of the page), these interactions will cause events to "fire" by executing some code associated with the event.

According to some embodiments, certain events may render new components. Some events may even load additional component types from the server dynamically. In some embodiments, certain events may simply manipulate or validate data on the client. For example, a well-defined, robust, client-side API can provide type-safe manipulation of client side data and components. Some events may call server actions to save data.

Accordingly, some embodiments provide a "long lasting page." Control may remain on the client in this client-side "application" for long periods of time, e.g., for several hours. Of course, the client may navigate to another page (e.g., due to the operation of a link), which is the end of the page's lifecycle. However, there may be no predetermined period of time during which the client may remain on the original page.

Page Authoring

Some embodiments may use a tag-based authoring environment for component definitions. In some embodiments, the rendering of a component definition tree can also establish the data that is sent to the client, as described in more detail below. Markup may refer to and/or embed other component definitions.

The term "attributes" as used herein refers to the inputs/outputs of a component definition. Attributes may be typed (for example, as Apex™ web service types) with validation at compile time. Accordingly, an Attribute could be a primitive such as a "String" or "Integer" or an object such as an "Account." (An "Account" may be an object that corresponds to a row in a database that contains information such as account number, account name, account type, etc.) For example, base Apex types include the following: Integer, Long, Double, Decimal, Boolean, Time, Date, DateTime, String, ID, Blob, null, SObject, List, Set, Map and Component. Types may be any of the foregoing, or any object that is made up of such types, nested arbitrarily deep. Java types include the following: byte, short, int, long, float, double, boolean, char and String. These types can also be composed into classes and nested.

When a component definition is embedded, expressions can be bound to its attributes. The actual runtime attribute binding may happen during server-side rendering. Binding may, for example, use formula expressions to reference controller data. Examples of type-checking operations that may be performed during the creation of an instance tree are provided below, with reference to FIG. 4.

According to some implementations, attributes that are of type "Component" (which may also be referred to as "Facets") allow for component definition extension. However, in some embodiments such component definition extension may not include all features of "extension" as the term is used in object-oriented programming. A component definition can "extend" another component definition by providing one or more of its Facets.

Outside of attribute binding, formula expressions can be used in the body of component definitions. This can cause client-side data binding to take place. This may include data substitution during client-rendering. However, in some instances (e.g., for input component definitions) this may include read/write binding to a data store field. In some embodiments, a style sheet language (such as Cascading Style Sheets or "CSS") and/or other resources may be specified for each component definition. For file-based Lumen component definitions, such resources may be specified via the directory in which the component definition is defined).

Defining a Component

In some embodiments, component definitions may be both serve-able resources and the building blocks of other component definitions. Components may be defined by creating a directory with the name of the component definition. This section includes an example of defining a component, according to some embodiments. However, this example is not intended to be limiting in any way.

In this example, the first component definition will be named "zoo:monkey." Therefore, the "zoo" directory will be located and a subdirectory called "monkey" will be made.

There are a number of resources that may be placed within the "zoo:monkey" subdirectory. In some implementations, the naming conventions of these resources may be used to locate and/or identify the resources, rather than requiring explicit registration in configuration files:

/zoo/
  monkey/
    monkey.cmp: In this example, monkey.cmp is the only required resource. In some embodiments, this resource must have the same name as the component definition directory ("monkey," in this example). In some embodiments, this may be an XML-formatted file that defines the API and view of this component definition, e.g., the attributes, events thrown, events handled, and a tree of other component definitions that are the building blocks of this component definition.
    monkeyModel.apex: This is an optional Apex class that can be used as the model of the component definition. In some embodiments, members, methods and/or properties of this class that are annotated with @LumenEnabled will be made available on the client-side. When the constructor for the model is called, it may access the Component by calling, e.g., "Lumen.Component.get( )" The returned component definition may have "getter" methods for each of the Attributes that were defined on the component definition, and can be called to retrieve the values that were passed into the component definition.
    monkeyController.apex: This is an optional Apex class that can be used to define any Actions available to the Component. In some embodiments, actions must be static methods annotated with @LumenEnabled. According to such embodiments, a Controller will not be instantiated and cannot have any state, because everything on the Controller is static.
    monkeyTheme.css: This is an optional CSS stylesheet that will be loaded when this component definition is used. This stylesheet can be validated to ensure that it only contains style that applies to the component definition.
    monkeyController.js: This is an optional JavaScript class that defines client-side Actions. This JavaScript class may be much like the Apex Controller, except that these Actions can be executed on the client side (e.g., within a browser executing on a client device) and do not require communication with the server. The component definition may be passed into the Actions as a parameter.

monkeyRenderer.js: This is an optional JavaScript class that defines client-side Rendering of the Component. Two examples of methods that may be implemented on a client-side Renderer are render (Component) and rerender (Component). These examples will be described in more detail below. If the renderer does not exist, or if either method is not defined, the behavior may be inherited. The base Renderer implementations should be sufficient in most cases.

monkeyProvider.js: This is an optional Javascript class. If the monkey Component Definition is defined as an abstract Component Definition, the provider's 'provide' method may be used as a factory for obtaining a concrete implementation of monkey to use at runtime.

monkeyProvider.apex: This is an optional Apex class. If the monkey Component Definition is defined as an abstract Component Definition, The provider's 'provide' method may be used as a factory for obtaining a concrete implementation of monkey to use at runtime.

monkeyTest.js: This is an optional JavaScript Object that defines a test suite to be run in the browser against various configurations of this component definition.

images/: This is an optional directory that may be used as the root to any image paths specified in the Theme for this component definition.

Example of a .cmp File Format

The following is an example of a .cmp file format according to one or more embodiments.

.cmp files should be well-formed XML. The top-level tag is <lumen:component/>

For example, here is /zoo/monkey/monkey.cmp:

```
<lumen:component>
    <lumen:attribute name="hair" type="String" default="bald"/>
    <lumen:attribute name="emotion" type="String" default="indifferent"/>
    <div>I am a monkey. I feel {!v.emotion}.</div>
    <zoo:monkeyImage hair="{!v.hair}" emotion="{!v.emotion}" face="{!m.face}"/>
</lumen:component>
```

Defining an Apex Controller

The following is an example of an Apex Controller according to one or more embodiments.

```
public class MonkeyController {
    @LumenEnabled
    public static Face feedMonkey(Food food) {
        return new Face(food);
    }
}
```

Defining an Apex Model

The following is an example of an Apex Model according to one or more embodiments.

```
public class MonkeyModel {
    private Face face;
```

```
    public MonkeyModel( ) {
        Cmp.zoo.monkey comp =
            (Cmp.zoo.monkey)Lumen.Component.get( );
        this.face = new Face(comp.getEmotion( ));
    }
    @LumenEnabled
    public Face getFace( ) {
        return face;
    }
}
```

Definition Relationships

Following is an example of a grammar-like representation of the relationships between definitions and how they are expressed in markup, according to some embodiments:

EventDef
Attributes:
Extends: EventDef
Children:
AttributeDef
InterfaceDef

Definitions

In some embodiments, the types of definitions may include, but are not limited to, root definitions, associate definitions, subdefinitions, and/or definition references. According to some embodiments, definitions are objects that have a name, a location in source code from which they originate and a descriptor, and that are capable of validating themselves. Examples of some definitions and their relationships will now be described with reference to FIG. 1.

Root Definitions

In this example, root definitions 104 are top-level definitions. Other definitions may be used by a root definition. In some embodiments, the Lumen lifecycle starts with a root definition 104, usually of a component. (According to some implementations, a "lifecycle" begins when the server is initialized and the Definition Registries are created, and ends when the server shuts down and the Definition Registries are destroyed. A part of that lifecycle is a single request, in which those registries may be consulted.) Examples of root definitions 104 may include, but are not limited to component definitions, interface definitions and event definitions, which are referred to herein as ComponentDef, InterfaceDef and EventDef, respectively. However, some embodiments provide other types of root definitions.

Although such relationships are not indicated in FIG. 1, in some instances a root definition may be associated with another root definition. For example, markup language for one root definition may include a pointer to another root definition.

Associate Definitions

In some embodiments, associate definitions 112 are external to root definitions 104. Associate definitions 112 may have their own factories, parsers and caching layers.

As shown in FIG. 1, one instance of an associate definition 112 may be shared by multiple root definitions 104. Here, root definition 104a holds references to the descriptors of associate definitions 112a, 112b, 112c and 112d. Root definition 104b holds a reference to the descriptor of associate definition 112d. Root definition 104c holds references to the descriptors of associate definitions 112b and 112c. Examples of associate definitions may include, but are not limited to controller definitions, model definitions, provider definitions, renderer definitions, theme definitions test suite definitions and documentation definitions (also referred to herein as ControllerDef (Client and server), ModelDef, ProviderDef, RendererDef, ThemeDef, TestSuiteDef and DocumentationDef).

Subdefinitions

In some embodiments, subdefinitions are used to define root definitions, at least in part. For example, if the root definition is a component definition, the attributes of the component may be subdefinitions. An action may be a subdefinition of a controller definition.

In this example, subdefinitions 108 may be part of a root definition 104 or an associate definition 112. Here, subdefinitions 108a through 108n are part of root definition 104a. In this example, subdefinitions 108 do not have their own parser, factory or cache. Instead, subdefinitions 108 are stored directly on their parent definition (here, on root definition 104a). Whatever created the parent definition may also be responsible for creating the corresponding subdefinitions 108. Examples of subdefinitions 108 may include, but are not limited to: AttributeDef, RegisterEventDef, ActionDef, TestCaseDef and ValueDef.

Definition Reference

In some embodiments, a definition reference or "DefRef" is a special kind of subdefinition that points to another definition. Definition references may be used, for example, by compilers and parsers. According to some such embodiments, at runtime a definition reference can be turned into an instance of the definition to which it points. Examples of definition references may include, but are not limited to ComponentDefRef and AttributeDefRef. A definition reference is a type of metadata. According to some embodiments, a component definition has a body that includes other component definitions. In order to point to these other component definitions, the component definition uses one or more definition references.

For example, when a component is instantiated, the component definition may include attribute definition references for each of the component's attributes. The attribute definition reference points to the attribute definition that the process is attempting to define.

LumenContext

In one or more embodiments, LumenContexts can be created and destroyed by LumenContextFilter (e.g., during HTTP requests). Context can have a Mode, which can be passed to the filter using the lumen.mode request parameter. In some embodiments, the default mode may be "PROD" for production mode and otherwise it may be "DEV" (for development mode). Some embodiments may also provide various testing and instrumentation modes. The mode can be represented by an enum value based on which various parts of the implementation can make decisions. For example, in PROD mode, the JavaScript grouping mechanism may decide to compress the JavaScript, whereas in DEV mode it may not. More details regarding LumenContexts are provided below, e.g., with reference to FIG. 3.

Overview of a Component Request Procedure

Some example component definition request procedures will now be described with reference to FIGS. 2A and 2B. FIG. 2A outlines steps of method 200, which may be performed on the server side in one example. FIG. 2A outlines the steps of method 200 at a very high level. More details are provided below with reference to FIG. 3 et seq.

In step 204, a server receives and parses a request from a client. In this example, the request is for an instance of a component definition. However, a client may request other data structures, such as models, events, event definitions, data stores, etc. The request may originate, for example, from a browser that is executing on a client device. The request may be received, e.g., by a Java servlet executing on a server.

According to some embodiments, by way of the request, the client device may be asking the server for a component definition according to a component name and (optionally) according to some attributes. The server may, for example, convert all query string attributes in the request into strongly typed attributes for the component definition. In this example, the request is made via HTTP.

In step 208, the server either builds or retrieves the component definition. First, the server may determine whether the component definition is already cached. The server may query a registry of component definitions and determine whether the requested component definition is in the registry. If the registry does have the definition cached, it will return that definition. In some embodiments, a parsing service caches each component's definition, which may include its markup (its definition-references to other component definitions), its attributes, events, controller reference, etc. Resources such as CSS may also be parsed and cached.

If the registry does not have the definition cached, the process may be more complicated. Some details are provided below with reference to FIG. 3 et seq. The server may build the component definition, including all of its dependencies.

In some embodiments, a component definition may have a server-side controller whose purpose may include providing, during initial rendering time, the initial payload of data that is needed by the client. Such controllers may be, for example, Apex controllers or Java controllers. In some embodiments, attributes may be used to "send" data to a server controller during construction. In some Apex-based embodiments, a controller can read its attributes and use those values locally. Alternately, or additionally, the controller can query what it needs via Salesforce Object Query Language ("SOQL"). However, if a parent component definition wants to send data to a child component definition then the parent component definition can do so via attributes. Then, the client component definition may not need to refer to a database (e.g., to a parent/detail page that sends each related list component data via a "Rows" attribute, queried as part of the initial parent SOQL). In some embodiments, Lumen Apex controller definitions cache designated (e.g., with @LumenEnabled) getter method definitions as well as designated static actions, which form client-side stub methods for callbacks to the server.

In this example, the server will use the built or created component definition(s) to instantiate the component definition(s). (Step 212.) For example, the server may create a component instance tree. In some embodiments, the server output to the client may also include metadata about component definition types on the page. Such metadata may include CSS and/or other resources. The server output to the client may also include the definition of the page structure for client side rendering. According to some embodiments, this definition does not include the component instances, only their schematic layout (as represented in XML, for example).

One or more data structures may be referred to herein as "trees." In some embodiments, a tree may be a connected graph that includes two or more linked nodes where each node has zero or more children nodes and zero or more parent nodes. According to some implementations, a tree may be a directed graph with an identified root node. Thus, in contrast to some common definitions of the term "tree," some data structures that may be referred to herein as "trees" may be either acyclic or not acyclic.

In some embodiments, the server will create a "skeleton" component instance data structure or "tree" that does not include all of the details of the component instances. More details are provided below of how such skeleton component instance trees may be created and how they may be used on the client side.

According to some implementations provided herein, the server will then serialize the results for transmission to the client. (Step 216.) According to some such implementations, the server will then serialize the following: (1) the component instance data structure or "tree"; (2) data for the component instance tree; and (3) metadata that explains each item in the component instance tree. The server may serialize those elements into JavaScript Object Notation ("JSON") format, for example. The server may then transmit the serialized component instance tree, data and metadata to the client. (Step 220.)

FIG. 2B is a flow chart that depicts steps of method 250, which involves client-side operations that complement the steps of method 200. Method 250 may be performed, at least in part, by a browser executing on a client device. A high-level overview of one example of such client-side operations follows.

In step 224, the client sends to the server a request for an instance of a component definition. In some embodiments, component definitions may be requested in this form: /<namespace>/<component>.cmp.

For the monkey component referenced above, the request could be "/zoo/monkey.cmp." If any attributes were defined on the monkey component, their values could be provided in the query string. The attribute values may be validated against the component definition. If attribute values were not provided in the query string, defaults specified in the attribute definition can be used instead. An example of such a query string is:

/zoo/monkey.cmp?hair=fuzzy&emotion=hungry

The client receives a response from the server (step 228), which in this example includes the serialized JSON structures that are transmitted in step 220 of method 200. In some embodiments, the data structures received in the response from the server (e.g., the JSON data structures) can be used to initialize real JavaScript component instances on the client. Encapsulated/closured JavaScript objects for components, attributes, ComponentDefinitions, DataStores, etc., may be created. The initial page response can provide JSON objects representing the data and elements on the page. These JSON objects may be sufficient to cause the client to render an entire page. Moreover, these JSON objects may be sufficient to initiate the navigation and user workflow in a manner that may not require a traditional server "post-back" under most circumstances.

According to some such embodiments, these objects may not allow direct access to the private closure's data members, allowing for a robust client-side API. For example, in some such embodiments private data cannot be addressed externally because the pointers to these data cannot be accessed outside of the scope in which it was defined.

The client may use the serialized JSON structures as input and may re-create the component instance tree, e.g., in JavaScript. First, the client may deserialize the JSON structures to create a metadata structure. Such a metadata structure may be referred to herein as a "tree" even though not all such metadata structures will necessarily have a tree structure. (Step 232.) The JSON structures may be provided as a JSON string in text format, which may be parsed to form a hierarchy of loosely-typed JavaScript objects (the metadata tree). These JavaScript objects may be considered "maps," because they may not have methods set on them.

The client may traverse the metadata tree to create a JavaScript instance data structure or "tree." (Step 236.) The client device may know the format of the JavaScript tree. In this example, the client knows that the top-level node is a component, because the client had requested a component instance. The client device knows what the properties of that component instance will be, including properties such as the definition of that component. The client may traverse the JavaScript tree, e.g., in a depth-first manner, to initialize objects from the deserialized tree. If the client finds a definition in the JavaScript tree, then the client will initialize the definition. If the client finds a name in the JavaScript tree, just the descriptor rather than the entire definition, then the client will know that it has pre-loaded and cached the corresponding definition.

According to some such embodiments, traversing the JavaScript tree creates strongly-typed JavaScript objects that may be used on the client side for the rendering process. This group of strongly-typed JavaScript objects may contain both data and metadata, as its counterpart did on the server side: the resulting group of strongly-typed JavaScript objects may have essentially the same structure that the server started with, even though constructed by a different machine and in a different language.

Then, the client may render the desired component instance by traversing the instance tree. In some embodiments, the JSON serialized form of the component may contain references to everything that is necessary to run and/or render that component instance. This may include a reference to a ComponentDef, a model, a controller, attribute values, etc. Such a JSON tree may be quite large and may contain many references to the same objects. Therefore, in some embodiments, each object may only be serialized in full the first time it is encountered in the tree. The remaining references may, for example, just contain a reference ID that can be used to recreate the references in memory on the client. Accordingly, in some embodiments the deserialization process may involve resolving serial reference IDs.

The initial response may also include a list of name spaces for the client device to pre-load. Different customers (or other individuals, groups or entities) may have their own name spaces. The name spaces may be specified in the definition of the top-level component that has been requested. All of the definitions in those name spaces may be pre-loaded and cached on the client device, so that these definitions do not need to be put into the component instance tree provided to the client device. Having these definitions cached on the client device helps to keep the tree (or other data structure) provided by the server to the client relatively smaller: the data structures that are subsequently provided to the client device do not need to include any definition data from the cached name spaces.

Some embodiments described herein include an engine, such as a JavaScript bootstrapping engine, that may be loaded by the initial page response from the server. In some embodiments, the engine may be provided, directly or indirectly, as part of the initial page response. For example, if the server determines that a request was not initiated within an expected UI framework, but was instead initiated by a client's access of a Uniform Resource Locator ("URL") associated with the server, the response from the server may include the engine or a way of accessing the engine. The server may, e.g., include a reference to a resource (including the engine) for the client device to download. In other embodiments, the engine may already be loaded on the client device and may be invoked upon receipt of the initial page response from the server.

After bootstrapping and initializing the client engine, the client can create instances. According to some such embodiments, there are definitions and instances on the client side and on the server side. More details of related client-side operations will be described below with reference to FIG. 6A et seq.

Examples of Component Definition Retrieval and Construction

Figure 3:
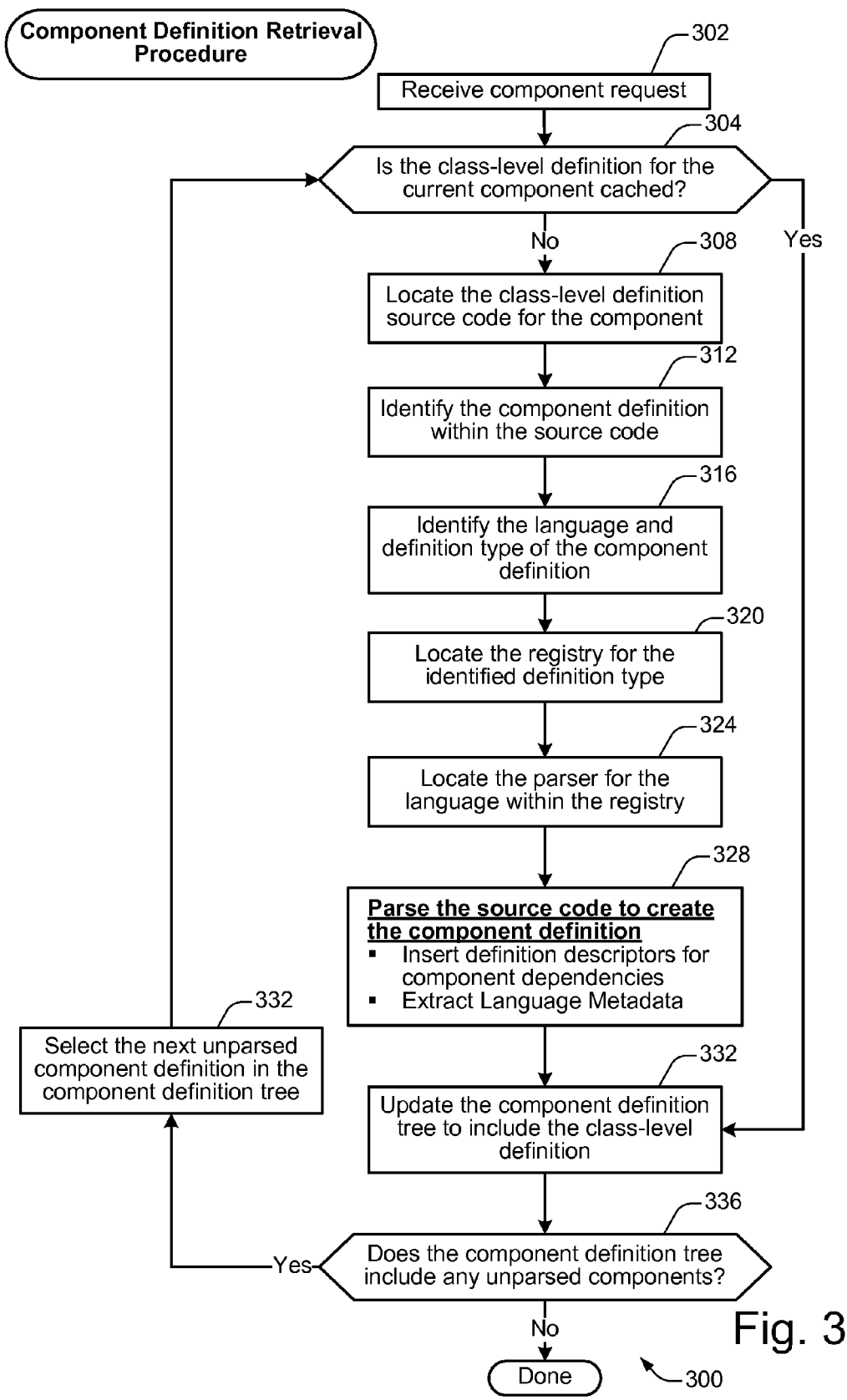
FIG. 3 illustrates steps in a process of retrieving component definitions according to one example.

Referring now to FIG. 3, examples of more detailed component definition retrieval and construction processes will now be described. Method 300 may be considered a compile stage, wherein the server finds the code relevant to a request and compiles the code into metadata forms that the framework can use. Accordingly, method 300 may also be considered a metadata creation process.

In this example, method 300 begins after a request for a component definition is received, which may be substantially as described above with reference to FIG. 2A or FIG. 2B. However, the request may not be for a component definition. In many occasions the request may be for a component definition, but the client may request whatever definition it has a need for. For example, different definitions may have been written by different people and may be controlled by different enterprises. The corresponding source code may or may not be available to the consumer of that component definition. Accordingly, some embodiments involve various security checks, examples of which are described below.

Some Lumen-Based Examples

In step 304, it is determined whether a class-level definition for the requested component definition is cached. In some embodiments, a Lumen Uniform Resource Locator ("URL") routes to a Lumen service, which attempts to retrieve the definition for the requested top-level component definition. Query string parameters can provide values for the attributes of that top-level component definition.

In this example, the request is made via HTTP. As noted above, in some Lumen-based embodiments, LumenContexts can be created and destroyed by LumenContextFilter (e.g., during HTTP requests). In some embodiments, after a Context is created by LumenContextFilter, HTTP requests are directed to a LumenServlet that is running on the server side. For GET requests, LumenServlet may use the LumenComponentService to construct an instance of the requested ComponentDef, mapping request parameters to the named AttributeDefs on the ComponentDef, so the values of the request parameters can be type-checked, validated, and set on the component instance as it is constructed by the LumenComponentService.

According to some such embodiments, a LumenContext can include a MasterDefRegistry, which can be retrieved using the getDefRegistry( ) method. The MasterDefRegistry may be the top-level DefRegistry, which in turn may be a wrapper around a list of DefRegistries that can load and cache Definitions. The MasterDefRegistries may index these delegate registries by DefType and Prefix. Accordingly, in some embodiments there may be one DefRegistry that handles Definitions for any given DefType and Prefix combination.

In some embodiments, the LumenContextFilter can look up the LumenContextService, and ask for a registry. The service can look up LumenRegistryProvider implementations that are currently available, aggregate the registries that they provide, and they can become the delegate registries in the MasterDefRegistry.

After the proper registry of component definitions has been identified, the server may query the registry and determine whether the requested component definition is in the registry. In some embodiments, a DefRegistry (also referred to herein as a "registry") can include a definition get(DefDescriptor) method. According to some such embodiments, each DefRegistry may have a DefFactory, which may also be referred to herein as a "factory." The DefRegistry may or may not cache definitions that are produced from the DefFactory, but can exist as an abstraction for the caching of them. Some registries may handle types that are already cached elsewhere in the system (such as Apex), whereas others may benefit from caching in the registry (such as Components).

If the definition is cached in the registry or located elsewhere in the system, the definition will be returned. The process will then proceed to step 332, wherein a component definition tree will be updated to include the definition. In some embodiments, a parsing service caches each component's definition, which may include its markup (its definition-references to other component definitions), its attributes, events, controller reference, etc. Resources such as CSS may also be parsed and cached.

If the definition is not cached, the process may be more complicated. In some embodiments, if the definition is not cached the server may locate the corresponding source code, parse the source code and then compile that source code into a definition. Then, the server may determine dependencies, search for those definitions, etc. According to some such embodiments, if a DefRegistry does not contain the requested definition, it may pass the request on to an associated "DefFactory." In some embodiments, there may be many implementations of DefFactories.

In this example, if the definition is not cached, the class-level definition source code for the component definition may be located. (Step 308.) The component definition may then be located within the source code (step 312), and the language and definition type of the component definition may be identified. (Step 316.) The registry for the identified definition type may then be located (step 320), as well as the parser for the language within the registry. (Step 324.)

The server may then begin an iterative process of looking for dependencies. According to some embodiments, the server may perform a breadth-first search. At each step of the search, the server may identify what it needs to compile, may obtain the appropriate parser and may obtain the code if it is not already cached. The server will make a list of things that still need to be compiled. The server may build the component definition, including all of its dependencies.

Control Over the Compiling of Dependencies and Memory Usage; DefDescriptors

Some compilation methods described herein are particularly advantageous for use in multi-tenant systems. In such systems a server (or group of servers) may have a large number of requests coming in at substantially the same time. Each request may be for multiple component definitions, each of which may have dependencies on other component definitions.

Other systems known to the inventors would perform a top-down parsing wherein all dependencies are compiled until the process is completed. For example, in the source of one file, a dependency may be found. That dependency would be compiled. At that point, the server would have two files open at once. If the dependency also has a dependency, the server would soon have three files open, and so on. In a multi-tenant system, the server may be processing thousands or tens of thousands of component definition requests, each of which may involve many dependencies. Therefore, if the server follows this procedure it may quickly run out of memory.

Moreover, other frameworks involve additional memory requirements. For example, some such other frameworks have references directly between two related definitions. Both definitions reside in memory concurrently.

Instead, some embodiments described herein provide markers that may be referred to herein as "DefDescriptors." A definition may have a DefDescriptor, which can act as the primary key for the definition. Rather than have references directly between related definitions, a DefDescriptor may be used to commemorate the reference. The DefDescriptor may, for example, have a string form that can encapsulate which subsystem (language) it is part of, what the logical grouping name within that subsystem is, what its local name within that grouping is and/or what type of definition is described, etc.

A DefDescriptor may be used as a key in a registry. Alternatively, or additionally, a DefDescriptor may be used as a key passed to a factory to retrieve the actual definition when it is needed. This loose coupling of definitions allows for higher performance in large scale multi-tenant systems, wherein the number of definitions required to run the system may be very high. In conjunction with a caching system, DefDescriptors may allow for describing a complex hierarchy with a reduced memory footprint. DefDescriptors may also allow seamless serialization and deserialization of these hierarchies between distributed systems.

Some embodiments provide novel methods of managing component definition (and other) requests, so that servers in multi-tenant systems do not become overwhelmed. In order to avoid running out of memory, some compiler embodiments of the invention do not compile all of the dependencies at once.

Some such embodiments use DefDescriptors to provide such functionality, at least in part. According to some such embodiments, the server may convert what is received in a component definition request (e.g., a name and the type of thing that a client device is looking for) into a DefDescriptor. The server may iterate through the component definition and make a list of all of the DefDescriptors that it will need to compile before it can complete the compilation step; this process may, for example, be performed serially.

The server may determine what DefDescriptors are currently on the list and may compile those in order. The server may determine whether dependencies of those DefDescriptors produced another list of DefDescriptors. If so, the server may compile those in order, and so on. The server may go through a process such as this instead of compiling dependencies as soon as the server finds them.

For example, after a component definition has been identified (or built), the server may perform an iterative process of searching for the component definition's dependencies and of serially compiling each of the dependencies. According to some embodiments, component definitions are the top-level definitions: that is where a request starts and a component tree has to be built from one.

However, in some embodiments, the dependencies are not necessarily for component definitions. Various other definitions may come into play at some point, such as interface definitions, controller definitions, action definitions, model definitions, etc. These may all be parts of the dependencies that will be involved in the compilation process.

Other Memory Management Methods

According to some embodiments, the server does not allow anything to be stored in a main registry—or service other requests—until the compilation process is completed. The server may have a temporary registry that is used for the compilation process. Once the temporary registry is complete and everything is compiled in it, then (if the compilation process was successful), the contents of the temporary registry may be transferred into the main registry. Subsequent hits can find these contents in the main registry.

In part because of the number of possible component definitions that are made possible according to some Lumen embodiments, and also because of the likelihood of needing to interact simultaneously with a large number of clients (e.g., a million or more), in some embodiments it is not practical to have everything simultaneously cached in a server, or simultaneously stored in any kind of memory in the server. Instead, some embodiments allow predetermined data structures to fall out of memory.

For example, if there is a whole tree, it may not be necessary that every part of that tree, of every definition that tree requires, is in memory at the same time. In some embodiments, at least some definitions may fall out to a cache server. Such definitions may be retrieved when needed, just in time. In some such embodiments, definitions do not have pointers directly to the other definitions. Moreover, in some such embodiments, instances do not have pointers (e.g., Java pointers) directly to definitions. Instead, they may always be in descriptor objects.

Examples of DefDescriptors

In some embodiments, a DefDescriptor can function as a wrapper around a String and "DefType" with helpful accessories for parsing the String.

EXAMPLES

DefDescriptor("markup://foo:bar", DefType.COMPONENT);
DefDescriptor("markup://foo.bar", DefType.INTERFACE);
DefDescriptor("apex://foo.BarController", DefType.CONTROLLER); and
DefDescriptor("css://foo.bar", DefType.STYLE).

As indicated in these examples, the elements of a DefDescriptor may include, but are not limited to, one or more of the following:

DefType: An enumerated type or "enum" of supported Definition Types in Lumen.

In some embodiments, each value of the DefType enum may map to a single Interface which any implementations of the DefType must implement. Examples may include DefType.COMPONENT(ComponentDef.class) and DefType.ATTRIBUTE(AttributeDef.class). In most cases the DefType enum can be used to indicate which type a definition is, but in some cases it is more convenient in Java to refer to them with the associated Interface Class.

Prefix: In this example, the prefix is indicated just before the "//." The prefix can define a corresponding language. As noted elsewhere herein, controllers may be implemented in various languages (such as JavaScript, Java and Apex). Each of those implementations may have a unique prefix.

Namespace: Here, the namespace is indicated after the "://" and before the last colon or dot. For Java, this would be the package name. For Apex, this would be the System Namespace. For tags, this would be the XML namespace (e.g., the part before the colon).

Name: In this example, the name is indicated after the namespace. For Java or Apex, the name is the classname. For tags, name is the local name (after the colon).

QualifiedName: Here, the QualifiedName is the entire expression (e.g., prefix://namespace:name or prefix://name.space.name).

In some embodiments, there may be very few cases where one Definition maintains Java references directly to another Definition. Instead, a Definition may keep instances of DefDescriptors, and then the associated Definition can be retrieved from the registry when it is needed.

Parsers

Some embodiments provided herein involve a compiler that is essentially language-agnostic. A plurality of languages and corresponding parsers may be supported in such frameworks. Different types of definitions may be written in a variety of languages, each of which may become a different definition object in the memory. For example, some frameworks provided herein enable Apex, Java, JavaScript and CSS. Other frameworks may enable more or fewer languages.

A Java controller, an Apex controller and a JavaScript controller may each invoke a different parser, but each may extract the same metadata from the source code. All of them will create a controller definition object, regardless of which language it came from. This may be conceptualized as an abstraction of the language in which the code is written.

According to some embodiments, the server does not search for additional dependencies during the parsing process. Instead, after the server creates an initial definition, that definition will have a plurality of associated DefDescriptors. The server may query the definition for dependencies and the definition may return a list of DefDescriptors. The framework may provide parsers as needed. For example, for XML one may want to compile the component definition files, but one does not need to parse Java: instead, in some embodiments the "parser" is "go to the Java runtime," which is configured to compile Java. The server will obtain metadata from that.

Accordingly, one may extract the metadata for whatever type of definition one is looking for. The type of definition will indicate what type of object will result. The language indicates what type of parser to use (if any).

Other embodiments may include fewer parsers, whereas still other embodiments may include only a single parser, such as an XML parser. Regardless of the number of parsers, various embodiments provide a compiler for components, a compiler for controllers (which may define a number of actions) and a compiler for models (which may define the data that we put into those controllers). Other compilers may also be provided. Components, controllers, models, etc., may be compiled and turned into definitions, representations of which may be put into a caching registry.

Using the identified parser, the located source code may be parsed to create the component definition. (Step 328.) Definition descriptors may be inserted for component definition dependencies. Corresponding language metadata may be extracted.

According to some implementations, DefDescriptors may also play an important part in the operation of a parser, such as the XML (Markup) Parser implemented in some embodiments of Lumen. When reading a ComponentDef from the XML in a .cmp file, for example, there may be references in the markup to other Definitions. As these are read, DefDescriptors can be created to memorialize the reference. After the ComponentDef has been completely parsed, it can be queried for its dependencies. Those DefDescriptors can be reported as dependencies, and then each of them can be parsed sequentially, rather than requiring recursive parsing of the definitions, which could become unwieldy.

In some embodiments, parsers may be used by some of the DefFactories. For example, a DefFactory may go to a parser to parse source (e.g., markup, JavaScript or CSS) or make calls into an external system (such as Java or Apex). Parsers may have a (Definition parse(DefDescriptor, Source)) method on them. The Source object may be an abstraction of the actual File or source code. A Reader and a Writer can be retrieved from the Source, as well as lastModified information and a unique identifier (in the case of File, the file path). Factories that deal with parsers can be initialized with a group of SourceLoaders that contain logic about how to locate and load code, and create Source instances that may then passed be to the parser by the factory.

Some Lumen embodiments provide a parser implementation called XMLParser. XMLParser can be used to parse root definitions (such as ComponentDef, InterfaceDef and EventDef), as well their subdefinitions (AttributeDef, EventHandlerDef, etc.) for implementations in which their primary source file format is XML. In some such embodiments, XMLParser uses a Streaming API for XML ("StAX") XMLStreamReader and can use appropriate XMLHandler implementations to parse each tag encountered in the XMLStreamReader.

According to some embodiments, each definition class may have an associated Builder class, which is a mutable object that can be used (e.g., by parsers) to construct the definition. After populating the Builder's properties, its build( )method may be called to construct the definition instance. According to some embodiments, definition implementations may be immutable objects.

In some implementations, registries may also have methods such as save(Definition), which writes the definition back to source (if possible) and find( ) which can be passed patterns of DefDescriptors to look for in source. Most of these calls may be delegated to the factory, since they may not require caching.

Security Checks and Versioning

According to some embodiments, different definitions may have been written (for example) by different people and/or enterprises. Suppose a person built a component definition and sold it on an "App Exchange" or the like. Suppose further that another person or entity is now using the component. What that person may be allowed to do with the component may be different from what the creator is allowed to do with the component. For example, the source code for the component definition may or may not be available to a "consumer" of that component.

Therefore, there may be various security checks regarding what a person can and cannot do with a component definition. Such determinations may be made, for example, according to access permissions such as the user's role, the user's group, the organization's permissions, etc. For example, the server may determine whether a client is allowed to "extend" a component definition or only to use it as a consumer. (A second component definition that extends a first component definition has all of the attributes and abilities of the first component definition, and then some more specific ones.) A third party may, for example, have created a "contacts list" component definition and may have sold the component definition on an "app exchange." The third party may have indicated (e.g., by a component definition setting) whether she wants to allow her customers to be able to extend the "contacts list" component definition to create a "sortable contacts list" component definition.

Such security checks could be made during any part of the component definition retrieval procedure. For example, such a security check could be made just before or just after step 304: When the server is determining whether the class-level definition is cached (or before that), the server may determine whether the tenant has permission to access this particular object. Alternatively, or additionally, such a security check could be made before allowing source code to be parsed and/or in connection with the metadata extraction of step 328. For example, it may be determined that a component definition has another component definition as a dependency, but that this tenant does not have access to the other component definition. The server may indicate a compiler error if the tenant does not have access to this dependency. This security check may be worth making in the future for a same tenant and the same component definition, because the tenant could subsequently obtain permission to access the dependency.

Related issues arise in the context of versioning. When there is an upgrade, there are various ways that one could provide the upgraded code to people who have installed earlier versions. For example, there may be a new release involving upgrades to existing Lumen component definitions, but customers may nonetheless expecting the old version to work the way it used to. In some instances, a customer may have developed an application that used features of the old version. Some implementations may allow the customer either to access the old version or upgrade to the newest version, the latter of which may be the default.

In some implementations, versioning may be performed on a definition-by-definition basis: there may be a separate version for each definition. Client requests for instances may be received and processed according to a definition name. The descriptor of the name may indicate the version of the definition. If this information is lacking, the default may be to the newest version of the definition name. For example, such determinations may be made just before step 304.

Completing the Process

After step 328 is completed, the process continues to step 332, wherein the component definition tree is updated. After the top-level component definition is processed, a similar process is performed for each definition in the tree of definitions. Each of the top-level component definition's children are checked for dependencies. According to some implementations, this process is performed in a breadth-first manner, wherein each layer is entirely processed before proceeding to the next layer. Such implementations can provide benefits in terms of memory management, as compared to depth-first approaches.

Accordingly, in step 336, it is determined whether the component definition tree includes any unparsed component definitions. If not, the process is complete. However, if the component definition tree does include any unparsed component definitions, the next unparsed component definition in the component tree is selected. The process may proceed to step 304 and may continue until it is determined in step 336 that the component definition tree does not include any unparsed component definitions.

The next unparsed component definition may be identified by traversing the component definition tree. In some implementations, the component definition tree may be traversed recursively using a technique such as a depth-first traversal, breadth-first traversal, or other type of tree traversal. Since the "tree" may or may not be acyclic, a record identifying component definitions that have already been parsed may be kept. When the tree is traversed, each component definition may be compared against this record to determine if the component definition has already been parsed. Because the tree traversal can avoid traversing and parsing component definitions that have already been parsed, the tree traversal can terminate when every component definition has been parsed, even though the tree may not be acyclic.

Examples of Creating an Instance Tree

After the component definition retrieval process is complete, an instance tree may be created. Some examples of creating instance trees are provided in this section.

Some steps in one example of an instance tree creation process will now be described with reference to FIG. 4. Method 400 may be performed, at least in part, by a server in a multi-tenant database system. At this point, the server has found or built all definitions relating to the client request. The next step in this example is to instantiate a component definition. Here, the process starts with a component definition at the top level: in this example, method 400 starts when an indication is received of a component definition to instantiate. (Step 402.) A root component definition is then retrieved. (Step 404.) Starting with the root definition, the server may now create a component instance out of that component definition.

However, once the process begins, other definition names may be involved, e.g., for interfaces, controllers, etc. In some such embodiments, definitions do not have pointers directly to the other definitions. Each definition may define how it uses the other definitions that it references. The root component definition may have a number of attribute definitions that indicate how the component is constructed and what data it uses. The root component definition may have a number of other references to other components, which may be conceptualized as indicating "this is what I am made of." This information may indicate the order that the constituent parts are in and how they fit together. This information may also define interactions between the constituent parts.

Instantiation of Abstract Components and Interfaces

In step 408, it is determined whether the current component definition type is a concrete component definition type. Our root component definition, for example, may be "abstract" or "concrete." The terms "abstract" and "concrete" are used herein substantially as the terms are used in the object-oriented programming arts. For example, "ball" may be an abstract or non-concrete component definition, whereas "soccer ball," "basketball," etc., may be concrete component definitions. An interface is another type of non-concrete component definition. An interface may be conceptualized as defining a shape of a component definition, but not the contents. An abstract component definition could do both.

Despite the similar usage of terms such as "abstract" and "concrete," however, some instantiation processes provided herein are different from those of the prior art. With most languages, an abstract component definition such as "ball" could not be instantiated. In Java, for example, one could not directly create a new instance of an abstract thing such as a "ball." With such languages, one must instead instantiate a particular type of ball. A factory is made that takes in some arguments and returns, e.g., a soccer ball. A separate factory is required for each resulting concrete component definition type.

However, various embodiments provided herein allow for the instantiation of abstract component definitions. According to some such embodiments, there is no need to create a separate factory or some other code to instantiate a non-concrete component definition as each concrete component definition type. However, non-concrete component definitions are not complete. Therefore, some embodiments provided herein have another type of definition called a "provider." Each non-concrete component definition type (e.g., each abstract component definition and each interface) may have a corresponding "provider." The provider may comprise code, in whatever language was used for the component definition type (such as Apex or Java, for example). That provider is going to determine, based on the information available at the time, what type of concrete component definition will be instantiated from each non-concrete component definition. For example, the provider code may determine, based on the attributes that were passed in to the ball, the ball must be a soccer ball.

Accordingly, in step 412, the server will search for a provider for the current non-concrete component definition. This process may be based, at least in part, on a dependency that has already been compiled. A definition may have found that there is a dependency on the provider, so there may already be metadata in the metadata tree regarding what the provider is. Accordingly, in some embodiments, the server may search for the provider definition in the metadata tree. According to some embodiments, the provider definition may be static code that was written by the author of the component definition or interface.

In step 416, it is determined whether the provider can be located. If the provider can be located, it may be invoked. (Step 424.) According to some such embodiments, running the provider allows an abstract component definition to be used directly in markup language. If the provider cannot be located, an error is indicated. (Step 420.)

In some embodiments, the component definition retrieval procedure may terminate if an error is indicated. Alternately, the component definition identified in step 408 as abstract may be flagged as unavailable and the component definition retrieval process may continue. In either case, one or more errors may be logged and/or displayed to the screen. For example, a syntax error or an invalid nesting error may be logged and/or displayed.

By using extension and interfaces, some embodiments can avoid implementing all of the code that is required in most component architectures for instantiation of abstract component definitions. For example, suppose that one were using a component architecture such as JavaServer Pages or JavaServer Faces and that one wanted to have a standard button component definition. One could write, for example, "button label=foo." Suppose one wanted a special button with a box around it. What one would have to do is to make a box component definition and in the definition of the box component, one would have a component definition such as "name=my button." The component definition would have an attribute on it, e.g., "name=label, type=string."

The button definition also has a component definition, such as "name=button, attribute name=label." Now, within the definition of "my button," one would need to pass through the label, e.g., "label [of the button]=label." One would need to know, in advance, that a label is required and would need to expose the label. These processes, known as chaining and wrapping, can be annoying and cumbersome.

According to some embodiments provided herein, one could make "my button" extend "button." With the extension, one obtains all of the attributes of "button" without needing to "wrap" the button. For example, when one indicates "my box," one could also include the attributes of the super component definition of "my box." One could make "button" abstract, in which case no one could use it directly, or one could make it concrete, meaning that one could either use "button" or "my button." Alternatively, one could indicate that the component is an interface, which means that the component definition only has shape, not a body. In some embodiments, interfaces are not able to render themselves, so other code implements the rendering for interfaces.

In some embodiments, there may be a validation procedure to determine whether the component definition that was provided by the provider actually extends the abstract component definition or implements the interface (step 428). If the component definition that was provided by the provider does not extend the abstract component definition or implement the interface, an error is indicated. (Step 420.)

In some embodiments, the component definition retrieval procedure may terminate if an error is indicated. Alternatively, the component definition identified in step 408 as abstract may be flagged as unavailable and the component definition retrieval process may continue. In either case, one or more errors may be logged and/or displayed to the screen.

However, if the component definition from the provider actually extends the abstract component definition or implements the interface, the provided component definition is set as the current component definition. (Step 432.)

In some embodiments, the provided component definition will generally be a concrete component definition. However, this is not always the case. Therefore, in step 408 it is determined whether the provided component definition is a concrete component definition. If not, the process returns to step 412.

However, if the provided component definition is a concrete component definition, the process may continue to step 436. According to some embodiments, the process does not continue to step 436 until the answer to step 408 is "yes" for every component definition: at that point, a concrete component definition has been identified for each component definition. According to some such embodiments, the server now has all of the metadata that it will need to build an instance tree.

However, in some embodiments, the server does not necessarily have all of the concrete component definitions at this stage. The server may only have determined that all of the concrete component definitions exist, that they are validated and that they are compiled. According to some such embodiments, only the root concrete component definition is required to start the next process.

Therefore, when the answer to step 408 is "yes," a concrete component definition has been identified for at least the root component definition. Using that definition, the server may create a component instance. During the construction of that instance, the component instance may have a number of properties set on it.

According to some embodiments, every component definition extends—at the least—an implicit component definition called "Lumen component." (One exception is "Lumen component" itself.) In some such embodiments, if a component definition is constructed, what the component definition extends must also be constructed in order for the component definition to be complete.

Therefore, in step 434, it is determined whether there is an uninstantiated super component definition. If so, the process continues to step 436, wherein the super component definition is constructed. The constructed super component definition becomes a property of the component instance.

The super component definition will have attribute values. As the super component definition is constructed, its attribute values are loaded. An attribute value may be a value, a string, or any object, e.g., any Apex or Java object. However, an attribute value of a super component definition (or another component definition) may comprise a component definition or an array of component definitions, in which case the process of step 436 will recurse. If step 436 recurses, then an Instance Tree Creation Procedure may be called, starting with step 404, to create the super component definition and/or component definitions included within the super component definition. Thus, any or all of the steps shown in FIG. 4 may be performed when constructing the super component definition 436. When the super component definition is constructed in 436, the recursive call may terminate and the procedure may progress to step 438.

As noted above, according to some embodiments a component definition may include a "model." The model may be, for example, an Apex class or a Java class from which data may be obtained. In step 438, it is determined whether the component definition has an associated model that has not been instantiated. If the answer is "yes," the process continues to step 440. Instantiating a model may involve obtaining an Apex class or a Java class and making an instance of it. Instantiating an Apex or Java class may involve, for example, executing the constructor method of the Apex or Java class. Executing the constructor method may include running database queries, setting initial values for attributes of the model, and any other initial operations. Although in some implementations the instantiation of the component model involves a recursive call of the procedure shown in FIG. 4, in other implementations queries for data are performed in the constructor to initialize values that will be accessed by the getters during serialization.

When the tree is being created, the server will evaluate a component's definition, which may indicate references to one or more other component definitions. The definition may also indicate how the process should be ordered, e.g., which component definition should be created next. Some attribute values may be passed from component definition to component definition. Such attribute values may, for example, have come from a component's model, or from another attribute that was passed into the component definition from elsewhere. Alternatively, the component definition could have created the attributes itself: the markup inside that component's definition may create more component definitions and specify them as attribute values. In such cases, the server may determine that component instances will need to be created.

However, if component definition A has component definition B passed into it, then according to some embodiments component definition B had to come from somewhere else, e.g., from component definition C that has instantiated component definition B. If so, component definition B would pass it as an attribute value to component definition A. At that point, component definition B has already been instantiated and has just been passed to component definition A. Both component definitions A and C will have references to component definition B, as attribute values.

In step 444, it is determined whether any attributes remain uninstantiated. If so, the next uninstantiated attribute may be selected (step 448) and it may be determined whether the attribute is (or whether the attribute refers to) an uninstantiated component definition. (Step 450.) If it is determined that the attribute refers to an uninstantiated component definition, the component definition may be instantiated in step 452. Step 452 may involve a recursive process that begins, e.g., by continuing to step 404.

Figure 4:
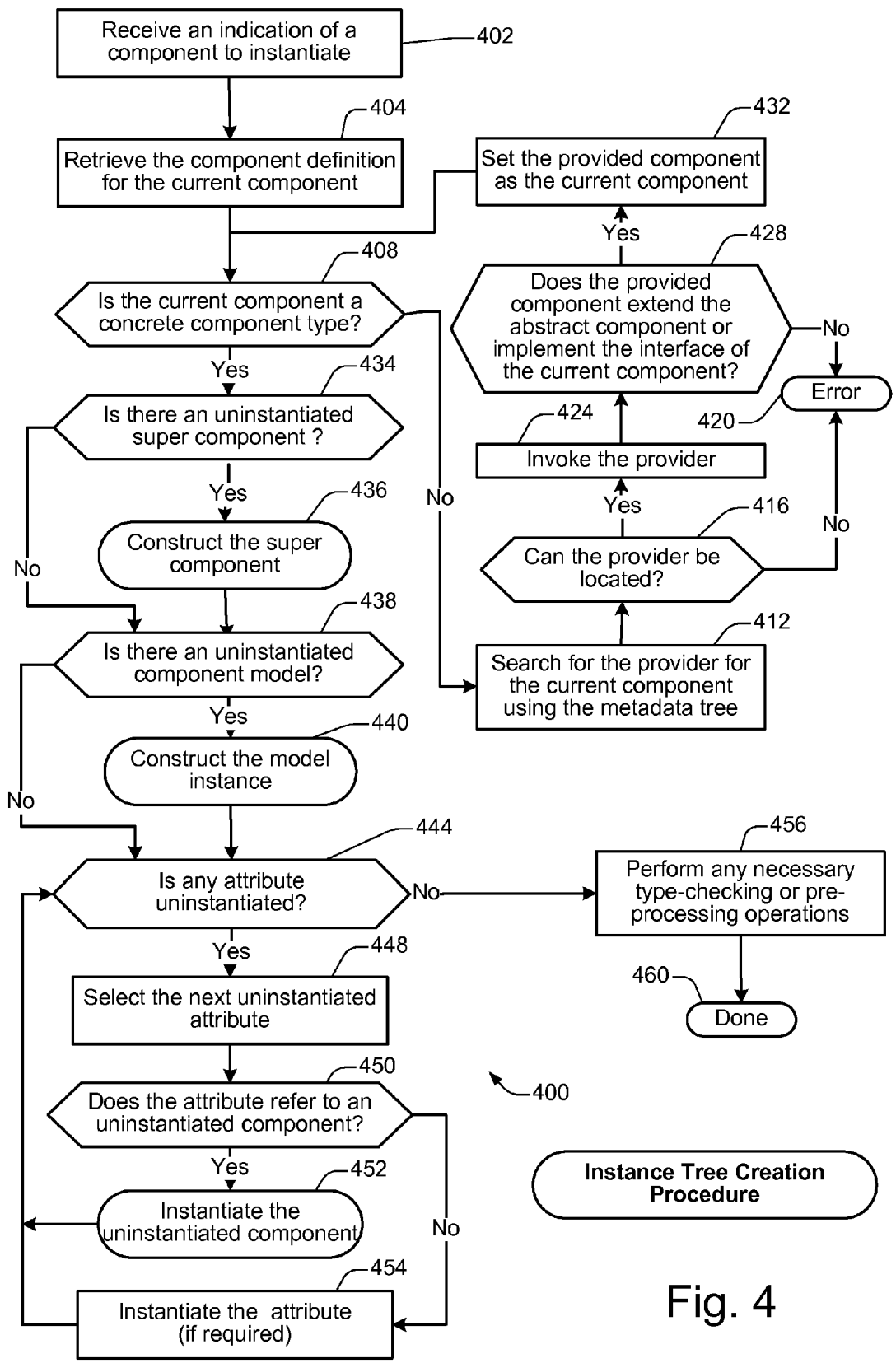
FIG. 4 outlines a process of instance tree creation according to one example.

When a recursive process is called at step 452 to instantiate the uninstantiated component definition, any or all of the steps shown in FIG. 4 may be performed. Because the process shown in FIG. 4 is recursive, the recursive process initiated in step 452 may itself call recursive processes. The recursive process identified at 452 may traverse the component definition tree until the branch of the component definition tree having the component definition identified in step 450 as uninstantiated is instantiated. When that occurs, each recursive call made from within step 452 will itself terminate, eventually returning to step 452 of the current process. Then, the process will return to step 444 to determine whether any other attribute of the current component definition is uninstantiated.

If it is determined that the attribute is not an unsubstantiated component definition, the process may continue to step 454, wherein the attribute may be instantiated, if so required. Some embodiments may involve at least some attributes that will not be instantiated. For example, in some embodiments controllers will not be instantiated and cannot have any state, because everything on the controllers is static.

There may be a number of non-component attribute values that need to be processed when creating the instance tree. Attribute values may, in some embodiments, come from a client request. Attribute values from the client request may be, for example, literals (e.g., numbers) or expressions. Such an expression may be, for example, a string in a predetermined format. Expressions or literals may be derived from other sources, such as from a super component definition, from a model or from other component definitions. In some embodiments, if an attribute was passed to a component definition by another component definition, the attribute will always be passed via an expression, e.g., via a formula. According to such embodiments, if an attribute comprises a formula, this means that the attribute was already created somewhere else.

An expression may or may not be parsed on the server side, depending on the implementation details of a particular embodiment. In some embodiments, a server will provide an expression to the client, not what the expression resolves to. The client-side resolution of the expression may be part of rendering, e.g. when associated data are viewed on a client device.

Allowing the "late" resolution of expressions, on the client side, can provide various advantages. For example, allowing expressions to be resolved on the client side can allow data to be refreshed without changing other parts of a page displayed on a client device. As time goes on, an expression may be pointing at a different model or a different version of the model if has been updated. The client can just re-apply the expression in order to refresh the corresponding portion of a page. The client (and in some instances the server), may need to do significantly less work to change a view on the client side.

However, in some embodiments, expressions may be parsed on the server side, e.g., to make sure that the type information is correct. Accordingly, the server may perform type-checking or other operations before the instance tree creation process is complete. (Step 456.) A failure in type checking might result, for example, in a compiling error (i.e. failure). Alternatively, a type checking failure may not prevent the completion of the compiling process, but may result in a warning that is saved to a log and/or printed to a screen.

For example, if an expression is received and the server expects a string to be passed in the expression (the expression may be, for example, an attribute of "type=string"), the server may check to make sure that the expression resolves to a string and not to a component or an object of some sort. In some such embodiments, the language of the model will determine, at least in part, the process of step 456. For example, if the model is an Apex model and "type=string," the server will look for an Apex string, which is different from a Java string. If the model is a Java model and "type=string," the server will look for a Java string. If the model is an Apex model and "type=foo," the server will check to see if there is some class called "foo" available in Apex. If so, that will become the type. When we get an expression passed in, the server may ensure that the method that expression would call will actually return a "foo."

Each component includes within its definition a list of all attributes of that component. Thus, for a particular component definition in the component definition tree, the process shown in FIG. 4 will terminate when all of its child component definitions are instantiated. At that point, a determination will be made at 444 that none of the attributes of the particular component definition are uninstantiated, and the recursive process will return to the high-level recursive process that called it.

Because the process shown in FIG. 4 is recursive, it will terminate when the entire tree is traversed. That is, when the recursive process shown in FIG. 4 returns for the highest level component definition in the component definition tree (i.e. the requested component definition), then the recursive process terminates. That is, the process terminates when the current node is the root node (i.e. the requested component definition), and when each of the children of the root node have been instantiated (i.e. when it is determined at 444 that each child of the root node has been instantiated.)

Examples of Serialization Processes

Other UI frameworks render a component tree by converting the components into markup language, such as HTML, and then provide the result to the client. In contrast, some implementations provided herein provide an intermediate form of code to the client. The client may use this intermediate form of code for the page rendering process. Therefore, rendering may be performed dynamically on the client side.

According to some embodiments, after the process of creating the instance tree is complete, the serialization process may begin. According to some such embodiments, the server will then serialize the following: (1) the component instance tree; (2) data for the component instance tree; and (3) metadata that explains each item in the component instance tree. The server may then transmit the serialized component instance tree, data and metadata to the client.

Although various serialization methods may be used, in some embodiments the server may serialize elements into JSON format. Some examples of JSON serialization methods are described in the following section.

JSON Overview

JSON is a lightweight data-interchange format. JSON is relatively easy for humans to read and write, is easy for machines to parse and generate, and is based on a subset of JavaScript. JSON is a text format that is completely language independent, but uses conventions that are familiar to programmers of the C-family of languages. These properties make JSON suitable as a data-interchange language.

JSON is primarily built on two structures: (i) a collection of name/value pairs; and (ii) an ordered list of values. In various languages, the collection of name/value pairs is realized as, e.g., an object, record, dictionary, hash table, keyed list, associative array, etc., and may be represented by "{ }." The ordered list of values in most languages is realized as, e.g., an array, vector, list, sequence, etc., and may be represented by "[ ]."

Java->JSON Serialization Overview

A Java structure can be serialized to JSON by, e.g., using the lib.json.Json class. This class has built in support for serializing Maps, Collections, Arrays, Strings, numbers, and Booleans. In order to add custom serialization for a Java class, one can implement lib.json.JsonSerializable, which includes one example method, serialize(Json). Other types may utilize a toString( )method called for serialization.

Entry Points

Various entry points can be utilized for serialization to JSON, some examples of which are shown in this section.

public String Json.serialize(Object). This example main entry point may be used if the user would like serialization to happen into a StringBuffer, and have the String returned to the user.

public void Json.serialize(Object, Appendable). This example main entry point may be used if the user would like to supply his own Appendable to which to write the serialization. This may be suitable for relatively large serializations, or any time that the user may not need to buffer the output.

public void json.serialize(Object, Appendable, boolean format, boolean refSupport). This example method can be used to indicate that the serialized form should be formatted (pretty printed), and if a non-standard or other type of Reference Support should be used (see below).

JsonSerializable

In order for a user to implement his own special serialization for an object, the user can implement the lib.json.JsonSerialiable interface, and implement its serialize(Json json) method. The JSON object that is passed into the method maintains state about the current serialization run, like which objects were already serialized (e.g., for referenceSupport), what the current indent level is, if formatting is enabled, and so on. This approach has utility methods for writing common structures to the stream.

Examples of these methods include: (i) writeString (String), which writes the quoted String to the Appendable; (ii) writeMapBegin, which properly indents, and then starts a map by printing a "{" character; (iii) character.writeMapEntry, which properly indents, and then writes the key and value out; (iv) writeMapEnd, which prints the "}" character and appropriately outdents the indent level; (v) writeIndent, which writes tab characters for the current indent level if formatting is enabled: (vi) writeBreak, which writes a line break if formatting is enabled; (vii) writeValue, which identifies what type of object is passed in, and performs proper serialization for the object; (viii) writeMap, which is similar to writeValue, but does not have to check the type, so it may be more efficient.

JsonDiffUtils

JsonDiffUtils may receive a Java object, and a unique name for that object, serialize the object to a JSON format, save the object in a gold file using the name given, and then on subsequent runs, the last-known-good version of the serialized object may be deserialized from the gold file, and compared with the object currently being passed in (the actual). Object equality can be used to traverse the object structure, which may be arbitrarily deep, and if any differences are found, an exception is thrown, which may be used to trigger a test failure.

Any Map, Array, Number, Boolean, String or nulls are supported for this serialization and deserialization by default, and other objects can provide custom serialization by implementing the JsonSerializeable interface.

In order to use JsonDiffUtils in tests, one can use: GoldFileUtils.storeAndAssertJsonDiff(String resultsBaseFilename, String testResults, String filenameSuffix). Also, the gold file name may be created in the results directory for a module, and may be resultsBaseFileName+filenameSuffix.

Some examples of serialization processes will now be described with reference to FIG. 5. In this example, the JSON objects are output by serialization method 500. Method 500 may be used to serialize the instance tree in order to facilitate transmitting the instance tree to a client machine. The instance tree may be constructed using, for example, the instance tree creation procedure shown in FIG. 4. Sending a serialized representation of the instance tree to the client machine may allow the client machine to reconstruct the instance tree. Further details regarding receipt and handling of the instance tree by the client machine are discussed below with reference to FIG. 6 et seq.

The serialization method 500 may be initiated by serializing the root object of the instance tree in step 502. In this example, the serialization method 500 is a recursive method that traverses the instance tree. Thus, step 502 may later be performed for children objects of the root objects, as discussed below.

As noted above, various entry points may be used may be used for serialization into JSON. That is, different objects may be serialized in different ways. In step 502, a predetermined entry point is used to begin the serialization process. The predetermined entry point may be identified by accessing a property of the object. The serializer may call a "serialize" method on the object at the appropriate time, or if that doesn't exist, a default method of serialization may be used given characteristics of the object in question.

In step 504, an object is selected for serialization. Step 504 may involve a determination of whether the selected object has already been serialized. In some embodiments, for example, a server may be able to determine whether a definition already exists on the client side. If so, the server need not serialize it. As described below, some embodiments also determine whether a property instance has already been serialized by the server.

In this example, the first object selected for serialization is a root object instance and it is determined in step 504 that the selected object will be serialized. Therefore, the process continues to step 512, wherein the next unserialized property in the object is selected. Each type of object may have its own serialization method, which may indicate the sequence of operations. For example, a primitive may be serialized by specifying its type and its value.

In some embodiments, the serialization process may include reference support. If Reference Support is enabled for a serialization run, any object that is annotated with @Serialization(ReferenceType=IDENTITY) or @Serialization(ReferenceType=EQUALITY) may be configured to use a special (nonstandard) serialization. In some implementations, the first time that an object is serialized, the object may be serialized as a map with two values: (i) serId: an integer unique to this particular object (within this particular serialization); and (ii) value: the actual serialized form of the object. Then, if the same object is encountered later during the same serialization, that same object can be serialized as "serRefId," where the serId that was used in the previous serialization is also utilized in the current serialization.

In some embodiments, reference support may be included for both objects and non-objects. Alternatively, reference support may be included only for objects, only for primitives, or only for certain kinds of objects or non-objects.

In step 514, it will be determined whether or not an instance of the property has already been serialized. Examples of methods that can be chosen for determining whether the object being serialized was already encountered may include the following: (i) EQUALITY (e.g., by calling equals( ) on the object), which may also be used in Java Map implementations; and (ii) IDENTITY, which may use "==" instead of "equals( )" so the objects may only be considered to be the same if they actually occupy the same memory space. This approach may also be used in java.util.IdentityHashMap.

In some such embodiments, one can choose which method is suitable for use for a particular object type by adding the class-level annotation "@Serialize," and then specifying which ReferenceType for the class to use. The default may be ReferenceType.NONE, which means that this feature will not be used at all for objects of this type. This feature also may not be used unless turned on for the serialization run, such as by setting referenceSupport to true when Json.serialize( ) is called.

If it is determined in step 514 that an instance of the property has already been serialized, the object need not be serialized again. Instead, a reference ID to the serialized instance will be inserted. (Step 516.)

If it is determined in step 514 that an instance of the property has not already been serialized, a reference ID may be created for the serialized property instance that is about to be made. (Step 518.) As discussed above, this serialized property instance may be referenced at subsequent stages in the process of instantiating the instance tree when another instance of the same property is detected in step 514.

In step 520, it is determined whether the property refers to an object. According to some embodiments, each property of an object will either indicate what serialization method to use for that property, or the property will be a primitive. According to some embodiments, substantially the same serialization method may be used for all literals or expressions. Therefore, according to some embodiments, if the property does not refer to an object, the property instance is serialized according to a default serialization method. (Step 524.)

However, if the property indicates a serialization method for an object, that method may be retrieved in step 528. The object may be serialized in step 532 according to the retrieved method. Depending on the object's contents, step 532 may involve a recursive process.

For example, the object may have children that are themselves objects. In this case, the procedure shown in FIG. 5 may be performed for each of the child objects. Each recursive call may create a new instance of the procedure shown in FIG. 5, e.g., beginning with step 502. However, when each of the child objects and other properties of the object serialized at 532 are themselves serialized, then the recursive call shown at 532 will terminate. At that point, step 532 will have serialized the object, including each of the object's children, and the procedure will proceed to step 536.

If the object is a component model, the serialization process may involve additional complexity. For example, the server may need to determine what to serialize based on the code for that model. The serialization process may not involve actually executing the code, but merely serializing out values that are already there. All getters may be called when the model is serialized to the client. The return values may be serialized for later binding. If a single instance of an object is serialized multiple times—anywhere in the tree—it may actually be serialized only once. References to that instance may be inserted at every subsequent location of that object in the tree. Deserialization on the client may reestablish the references substantially as they were on the server.

In step 536, the serialized element is written. The element may be, for example, an object, a property instance or a reference ID. According to some embodiments, serialized data are written to the client before the serialization process is complete. In some such embodiments, serialized data are continuously written to the client without being buffered on the server side.

In step 540, it is determined whether the current object includes any unserialized properties. If so, the process continues to step 512 and the next unserialized property of the current object is selected. If it is determined in step 540 that the current object does not include any unserialized properties, then the serialization process is complete for the current object.

In this example, if the serialization process is complete for the current object and if the current object is not the root object in the tree (i.e. not the object corresponding to the requested component), then the recursive procedure will return to step 532 for its parent object. In this case, the current object as well as all of its children properties (including children objects) will have been serialized, and the traversal of the current section of the instance tree will be complete.

If the serialization process is complete for the current object and if the current object is the root object in the tree (i.e. the object corresponding to the requested component), then the recursive procedure can terminate entirely and the entire instance tree will be serialized. In this case, the root object (i.e. the object corresponding to the requested component) and all of its children (including children objects) will be serialized, and the traversal of the entire instance tree is complete.

Figure 5:
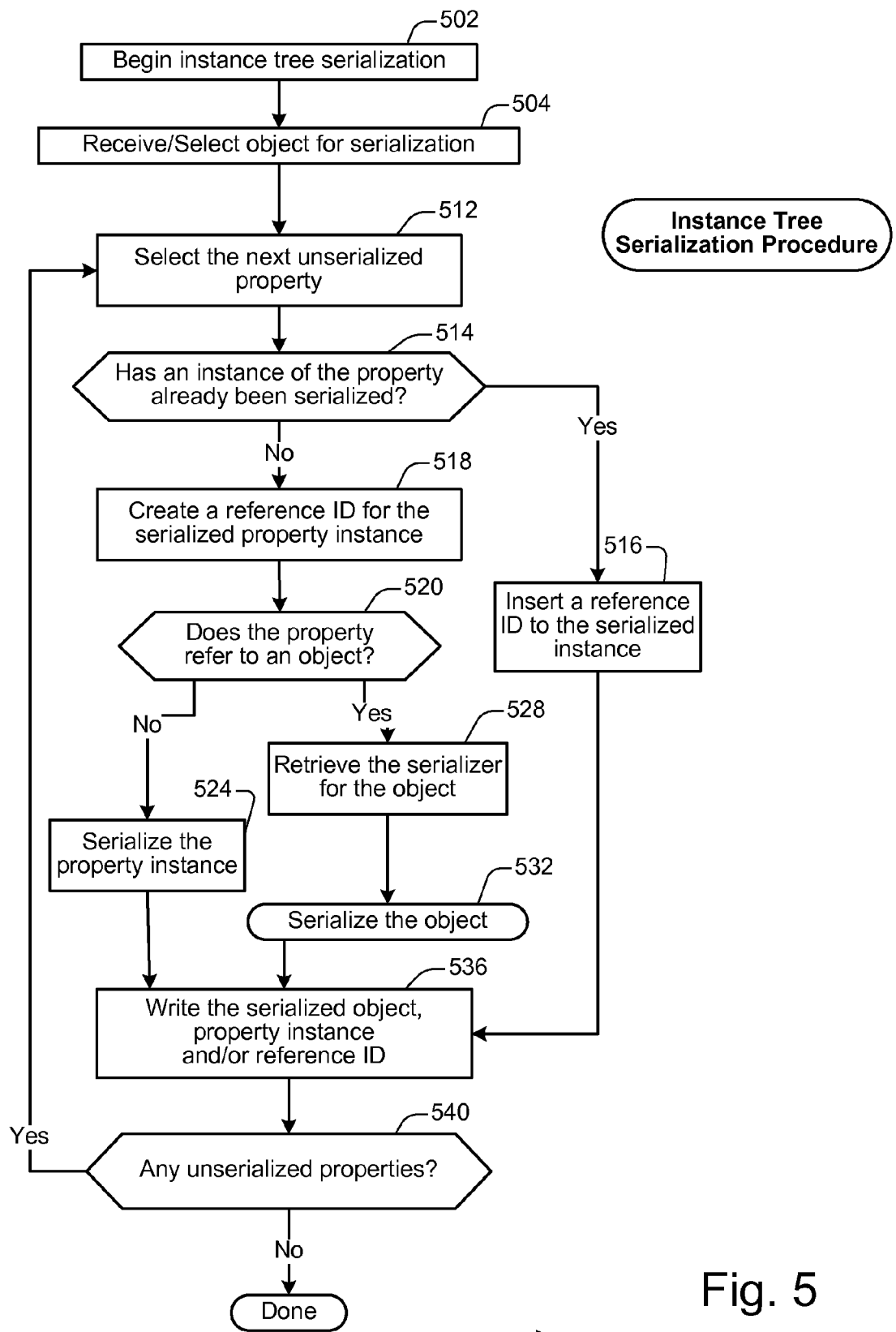
FIG. 5 illustrates steps in a process of serializing an instance tree according to one example.

Thus, whether the determination made at 540 results in the termination of the entire recursive process shown in FIG. 5 or only in the termination of the recursive process for some sub-tree depends on whether the object currently being serialized is the root node of the component instance tree.

Page Rendering and Re-Rendering

Figure 6A:
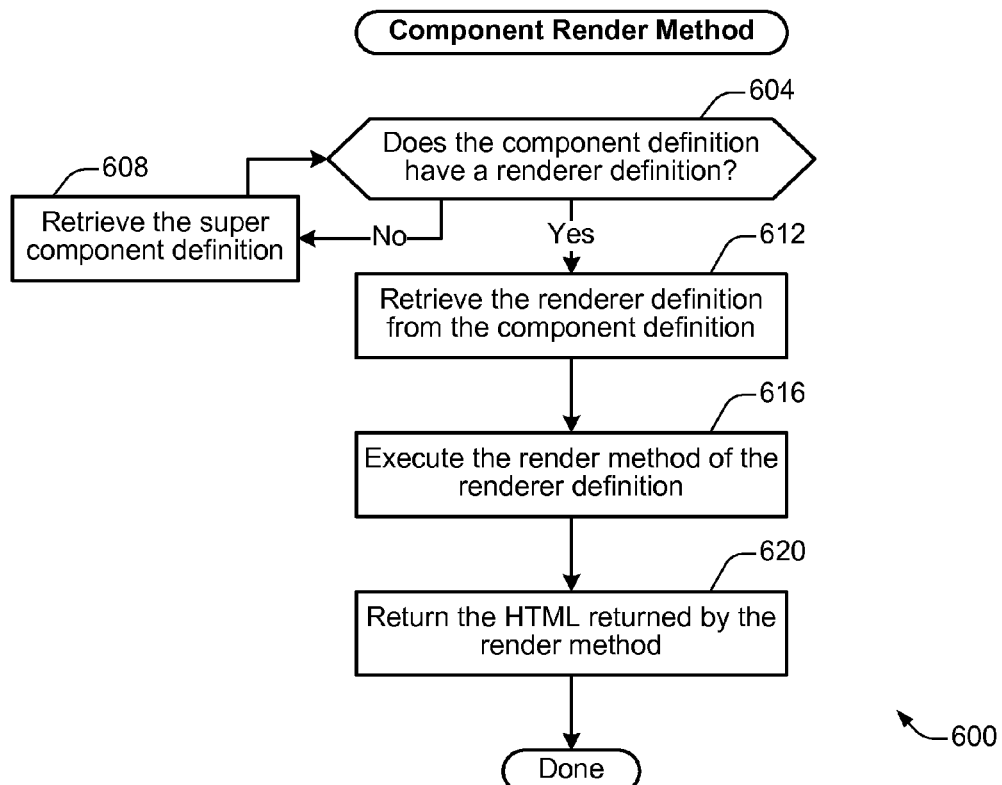
FIG. 6A provides an example of a component rendering method.
Figure 6B:
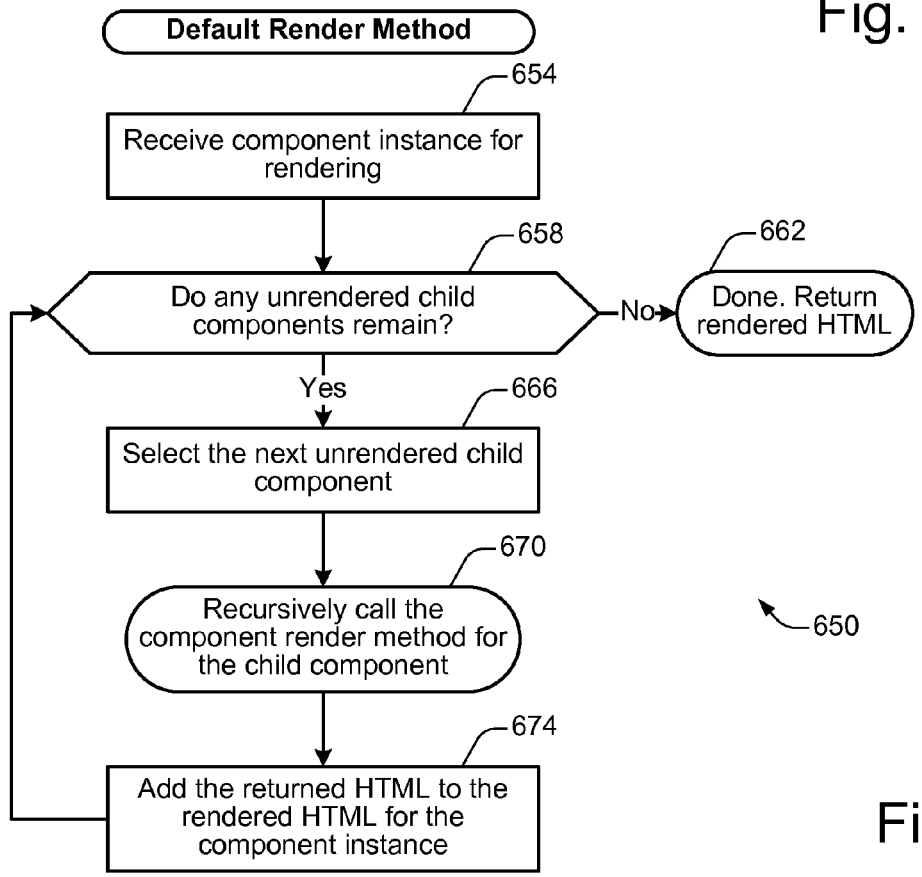
FIG. 6B provides an example of an alternative component rendering method.

Some examples of rendering methods will now be discussed with reference to FIGS. 6A and 6B. Referring first to FIG. 6A, method 600 outlines some steps of an initial page rendering process. Method 600 may be performed by a client device, for example, after having completed operations 224 through 236 of FIG. 2B. Here, a browser executing on the client device has previously sent a component request to a server and has received a response.

According to some such embodiments, the response included serialized instantiated component definitions, serialized data for the instantiated component definitions and serialized metadata for the instantiated component definitions. The client device has deserialized the response to create a metadata structure, such as a metadata tree, and has also traversed the metadata structure to create an instance data structure.

Methods 600 and 650 provide examples of traversing the instance data structure to render a page, which may be displayed on a display of the client device. In these examples, the instance data structure has references to metadata, e.g., to definitions. Referring first to FIG. 6A, method 600 may start at the root node of the instance data structure. That instance has a property, which is a component definition in this example.

In block 604 of method 600, the client determines whether the component definition has a property that may be referred to herein as the "renderer definition." In this example, a renderer definition is an associate definition related to the component definition (see the example of root and associate definitions shown in FIG. 1 and the related discussion). A renderer definition has an associated render method that may be used to render a component instance.

If it is determined in block 604 that the component definition does not have an associated renderer definition, then the component definition's super component definition will be evaluated to determine whether it has an associated renderer definition. If the component definition's super component definition has an associated renderer definition, the renderer definition is retrieved in block 612. If not, the process will evaluate the next super component definition in the hierarchy to determine whether it has an associated renderer definition. The process will be repeated until a renderer definition is found. According to some implementations, the process will always determine a renderer definition. In some Lumen-based implementations, this is true because the top of the hierarchy is "Lumen component," which has an associated renderer definition.

If it is determined that a component definition does have an associated renderer definition, the renderer definition is retrieved in block 612. In block 616, the client executes the render method of the renderer definition: here, the client passes the component instance into the renderer method of the renderer definition. In some embodiments, the render method renders each of the children of this component, recursively. In this example, HTML is returned by the render method in block 620. However, in some alternative embodiments, HTML is not returned by the render method. A renderer may be in another language, on another platform, etc.

A default render method 650 will now be described with reference to FIG. 6B. In block 654, a component instance for rendering is received from the instance data structure. The component instance is evaluated in block 658 to determine whether any unrendered child component instances remain. If so, the next unrendered child component instance is selected (block 666). Method 600 may be recursively called for the child component instance (block 670): the default render method may loop recursively through all of the top-level children of this component and may retrieve the proper renderer definition for that component instance.

In this example, a top-level renderer for a component instance is expecting that all children of the component instance will return arrays of HTML elements. The top-level renderer may take the HTML elements in order and append them to the browser's Document Object Model ("DOM"). (Block 674.) As with method 600, in some alternative embodiments HTML may not be returned by the render method.

In this embodiment, the process then returns to block 658. If it is determined that there are unrendered child component instances, the next unrendered child component instance is selected (block 666) and method 600 is recursively called for the child component instance (block 670). However, if it is determined in block 658 that no unrendered child components remain, rendered HTML is returned in block 662.

Some examples of re-rendering methods will now be discussed with reference to FIGS. 7A and 7B. An initial rendering process may begin with the assumption that nothing has been rendered thus far. By contrast, a re-rendering process begins after a page has already been rendered. Over time, some elements of a page may change, whereas other elements of the page may remain the same, or substantially the same. There may be no need to re-render elements that remain substantially the same.

For example, suppose that a table of data has been rendered on a page and displayed on the client device. Suppose further that some new data pertaining to the table has been received since the table was initially rendered. During a re-rendering process, it would not be desirable to completely re-render the table. Instead, it would be more efficient to retain most of the previously rendered table and to modify the table only slightly during the re-rendering process, to indicate the newly-received data.

Therefore, a re-rendering process may differ substantially from an initial rendering process. A re-rendering operation can, in some instances, be much faster than an initial rendering operation.

Figure 7A:
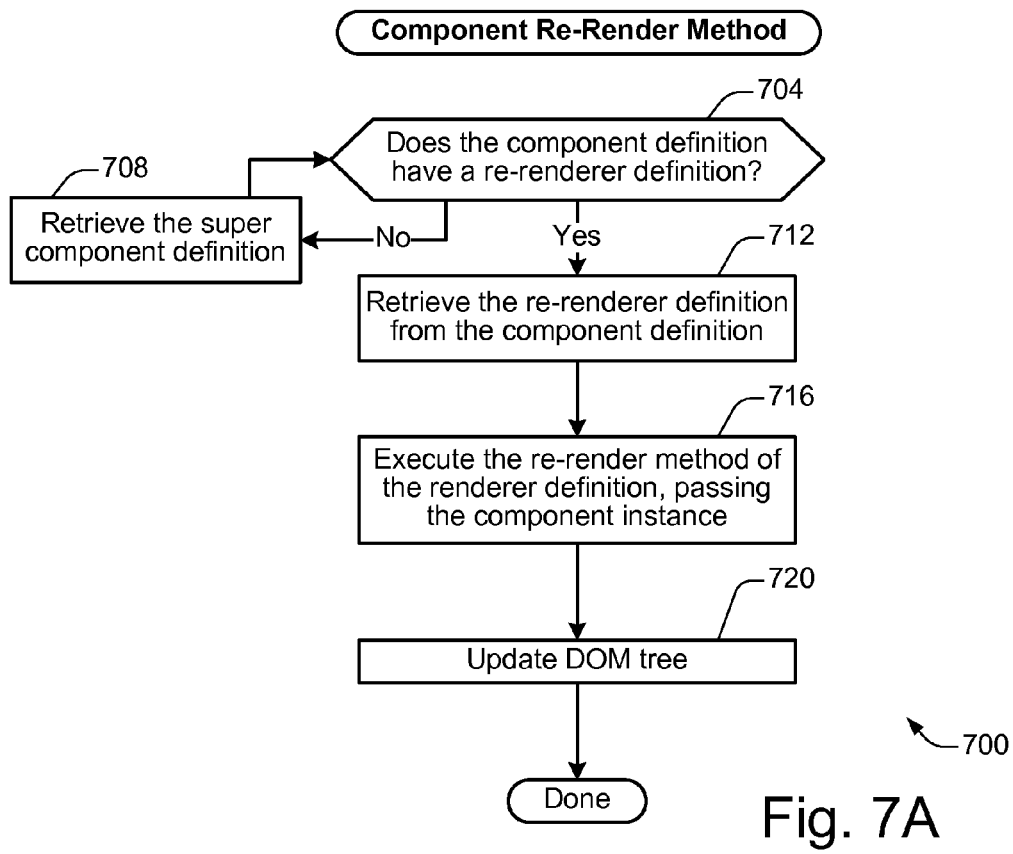
FIG. 7A provides an example of a component re-rendering method.
Figure 7B:
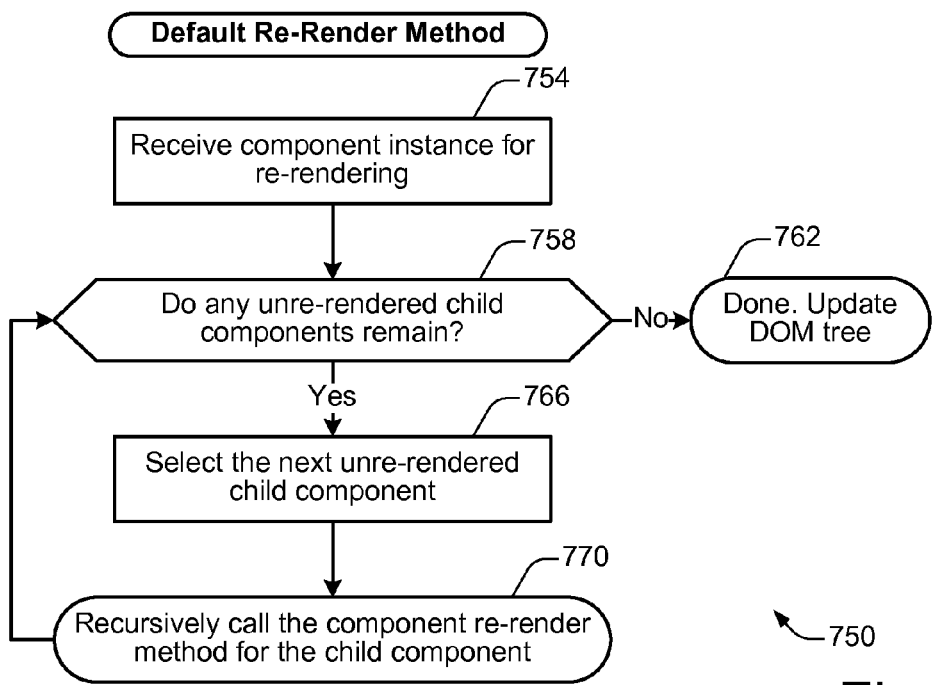
FIG. 7B provides an example of an alternative component re-rendering method.

Referring first to FIG. 7A, method 700 outlines some steps of a page re-rendering process. In block 704, a browser running on the client device determines whether a component definition has an associated re-renderer definition. If the component definition does not have an associated re-renderer definition, then the component definition's super component definition will be retrieved (block 708) and evaluated to determine whether it has an associated re-renderer definition. If the component definition's super component definition has an associated re-renderer definition, the renderer definition is retrieved in block 712. If not, the process will evaluate the next super component definition in the hierarchy to determine whether it has an associated re-renderer definition. The process will be repeated until a renderer definition is found.

In block 716, the client executes the re-render method of the re-renderer definition: here, the client passes the component instance into the re-renderer method of the re-renderer definition. In this example, HTML is not returned by the re-render method in block 720. Instead, method 700 involves updating a DOM tree that was formed during the initial rendering process. However, in some instances, HTML (or the like) may be returned by the re-render method. For example, the re-rendering process may involve rendering elements that were not previously displayed on the page.

A default re-render method 750 will now be described with reference to FIG. 7B. In block 754, a component instance for re-rendering is received from the instance data structure. The component instance is evaluated in block 758 to determine whether any unre-rendered child component instances remain. If so, the next unre-rendered child component instance is selected (block 766). Method 700 may be recursively called for the child component instance (block 770): the default re-render method may loop recursively through all of the top-level children of this component and may retrieve the proper re-renderer definition for that component instance.

In this example, the children do not return an array of HTML. Instead, each child update the DOM nodes that the child had created in a previous rendering or re-rendering process. Method 750 ends when it is determined that no unre-rendered child components remain. (Block 762.)

Event Handling

Some embodiments provide two general types of event models. One such event model may be global in nature. Another type of event model is not global, but is instead associated with a particular component. Either model may involve named events that can be "fired." For example, the firing of an event may correspond to input received via a user input system of the client device. Either of these event models may involve actions, which can be implemented, e.g., as JavaScript methods by a JavaScript controller. In such cases, the client may simply call the JavaScript method to implement the action.

Alternatively, the action may be implemented in a server-side language, such as by an Apex or a Java controller. If the action is implemented in a server-side language, the client may create a request to the server that indicates what action needs to be called and the parameters that should be passed into that method. The firing of an event may nonetheless invoke a client action, such as a JavaScript action. The JavaScript action may, in turn, call a server-side action.

On the server side, those actions may result in the construction of a new component, the construction of a new component data structure and/or the construction of arbitrary objects, which can then be serialized and sent down to the client. Server-side actions may call other call server-side actions, may fire more events, or may invoke client-side actions.

Accordingly, some UI frameworks provided herein allow a user to define how components can interact, what data the components pass between each other, etc. These parameters may be set when the component is defined. One may also define what actions will be run as a result of these component interactions. Moreover, one may be able to determine what processes will be run on the client side and what processes will be run on the server side. A single UI framework may allow and coordinate client-side and server-side operations. The UI framework may, for example, allow the user to define interactions on the server that will actually be executed on the client. Events may be fired on the client side and handled on the client side. Client-side actions may call server-side actions according to a well-defined application programming interface ("API").

In some implementations, when a browser is performing a renderer or re-renderer method, the browser will associate a browser event with a component-level event or an application-level event. The component author can decide what will happen and how it will happen.

Figure 8:
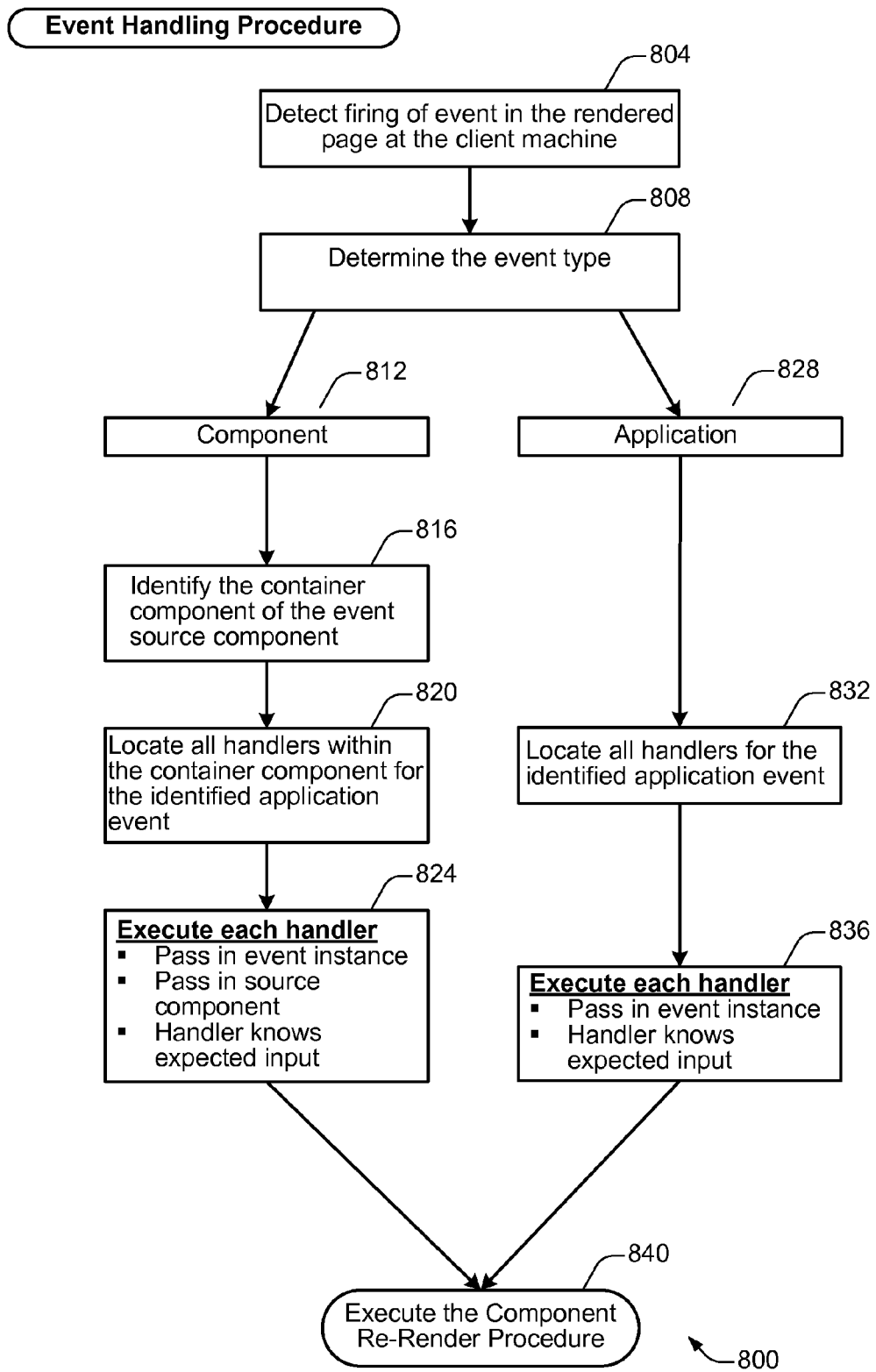
FIG. 8 provides an example of steps in an event handling procedure.

Referring now to FIG. 8, an example of an event-handling procedure will be described. Method 800 begins when a client device detects the firing of an event in a rendered page. (Block 804.) This detection may be made, for example, by a browser executing on the client device.

The event type is determined in block 808. In this example, the event may be an application-level event or a component-level event. If the event type is determined to be an application-level event type, the event may be broadcast to the entire page. Any component could potentially have an event handler for that application-level event. The event handler may, for example, be defined in markup language. If a component has an event handler for that application-level event, that event handler will run a subsequent action on the client as a result of receiving that event. Therefore, in block 832, all event handlers for the identified application-level event may be located, everywhere on the page.

In block 836, each event handler is executed: here, when the event handler is executed, the event instance is passed into the event handler. The events themselves may have properties that are passed through to the event handler. Events may have predetermined definition types, having certain attributes that are expected by the event handlers. Event types may, for example, be defined in the same way that component types are defined.

In some implementations, every type of event that can be fired may be strongly typed. Event definitions may be said to have a predetermined "shape," which corresponds to what the event attributes are and to the type of each event attribute. An event handler for this event will expect the event definition to have this predetermined shape. In some embodiments, when an event handler for an event is registered, the UI framework can validate what is being passed to the event handler as the event instance.

However, if it is determined in block 808 that the event type is a component-level event, the process of finding the corresponding event handlers may be more complicated. According to some implementations, only the parent of the component that fired the event can handle that event. Therefore, instead of locating every event handler everywhere on the page, the parent or "container" of the component instance that fired the event is identified in block 816. All event handlers within the container component for the identified application event may then be located. (Block 820.)

Then, each of the event handlers defined within the container component for this event may be executed. (Block 824.) The event handler execution process may involve passing an event instance and an event source component into each event handler. In some implementations, the event source component is a component object that has associated methods. The event handler may use attributes of the component. Alternatively, or additionally, the event handler may set attributes on the component.

In some embodiments, the author of the component determines what an event handler does. The handler may, for example, modify the data of a component. Such data modification may eventually cause a re-rendering of the component instance. The event handler may fire another event. The event handler may invoke an action. According to some implementations, the event handler itself is a client-side action, but the event handler may be configured to invoke another action, which may be a client-side action or a server-side action.

Client-side actions may be invoked synchronously, immediately when the code calls them. According to some implementations, requests for server-side actions triggered by an event may be put into a queue for later processing. For example, while a client-side action is executing, there may be a queue of server-side actions that need to be run. The client-side action may add to the list of server-side actions: when all of the client-side event handlers for this event are completed, some or all of them may have been adding to the queue of server-side actions that will subsequently be sent to the server. These requests may, for example, be sent in one transmission. The client device may receive a single response to all of them.

Because they are asynchronous, the requests that have been put into the queue may specify a call-back action, another client action that will be executed after the response is received by the client device. The call-back action may call a client action.

After the handlers have been executed, including call-back actions resulting from server-side actions, a component re-render method may be used to re-render the page, if necessary. (Block 840.) The client device may execute a re-render method on the top-level component of the instance data structure. If a component event type has been processed, the event handling procedure may have added more component instances to the tree and/or may have modified attributes of existing component instances.

Each renderer, in its re-render method, may or may not actually re-render a component instance. This may depend, for example, on whether and to what extent a component instance has been modified during the event handling procedure. For example, some component instances might not change under any circumstances. Other components instances may be updated, e.g., if new data have been received from a server. For example, if data are displayed in a table on the page, the receipt of new data may trigger an update of a corresponding part of the table. According to some implementations, this process may be executed quickly and efficiently, at least in part because the DOM tree may be retained and simply updated.

The server side actions may, for example, be methods in Java or Apex. Usually, when a method is run in a language of that nature, an ordered list of parameters is passed into the method. According to some implementations, a set of name/value pairs may be passed into the method instead of an ordered list. The names of the variables may be extracted from the source code, so these name/value pairs may be set as attributes for the action. This can be advantageous, because the process does not need to determine what order those attributes were in, in the source code. Moreover, this makes the process more compatible with JavaScript, which generally involves working with name/value pairs instead of arrays or ordered lists.

System Overview

Figure 9A:
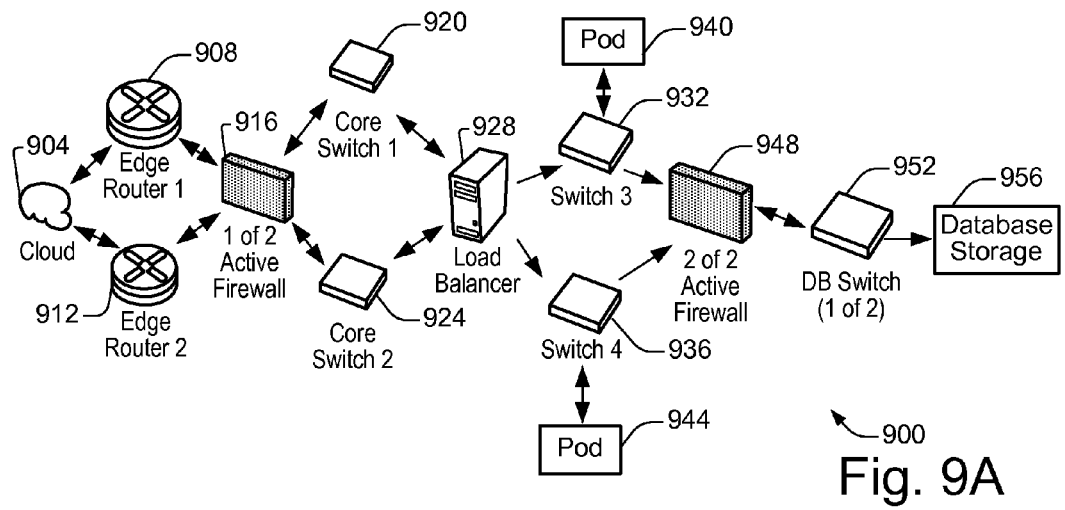
FIG. 9A depicts a system diagram that illustrates architectural components of an on-demand service environment, in accordance with one embodiment described herein.

FIG. 9A shows a system diagram 900 illustrating architectural components of an on-demand service environment, in accordance with one embodiment.

A client machine located in the cloud 904 (or Internet) may communicate with the on-demand service environment via one or more edge routers 908 and 912. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand service environment may communicate with a database storage system 956 via a database firewall 948 and a database switch 952.

Figure 9B:
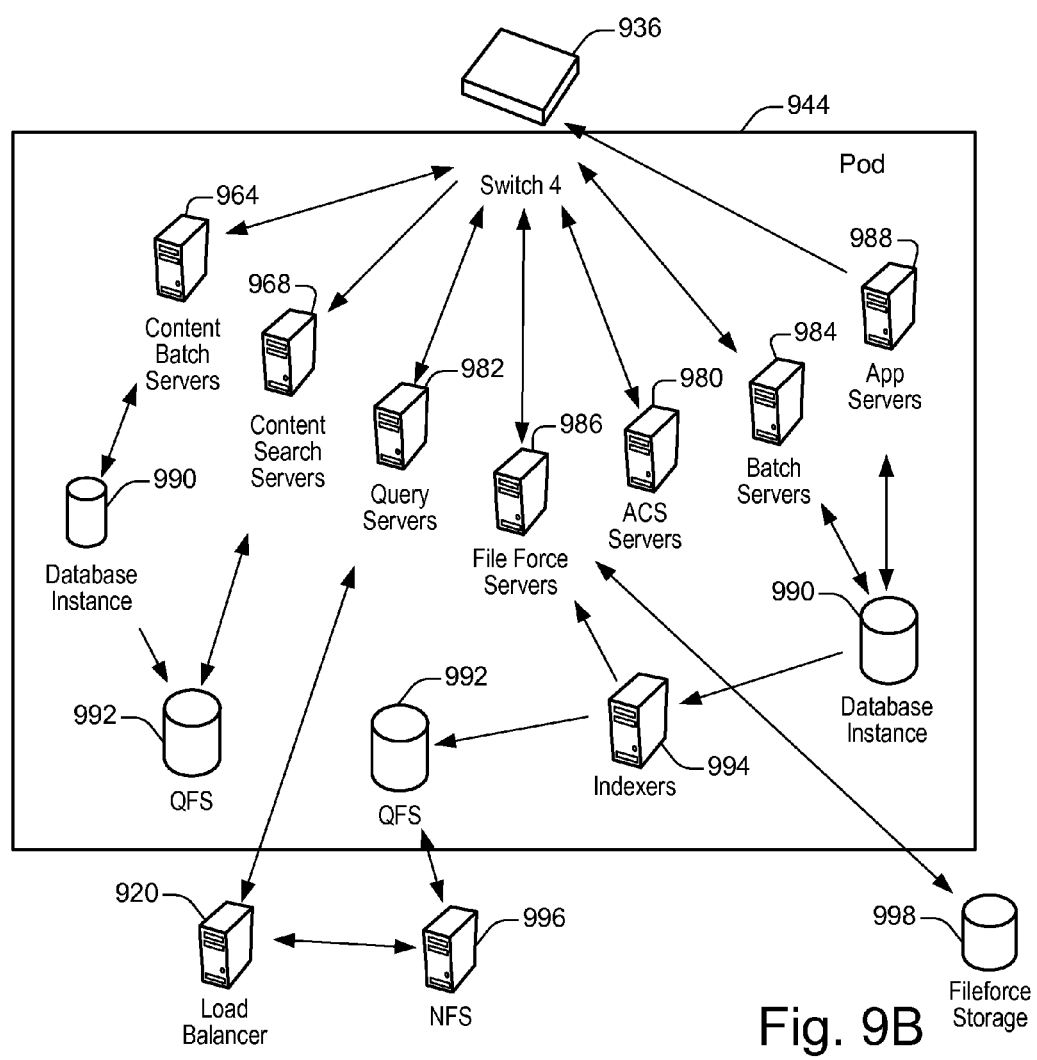
FIG. 9B depicts a system diagram that illustrates additional architectural components of an on-demand service environment, in accordance with an embodiment described herein.

As shown in FIGS. 9A and 9B, accessing an on-demand service environment may involve communications transmitted among a variety of different hardware and/or software components. Further, the on-demand service environment 900 is a simplified representation of an actual on-demand service environment. For example, while only one or two devices of each type are shown in FIGS. 9A and 9B, some embodiments of an on-demand service environment may include anywhere from one to many devices of each type. Also, the on-demand service environment need not include each device shown in FIGS. 9A and 9B, or may include additional devices not shown in FIGS. 9A and 9B.

Moreover, one or more of the devices in the on-demand service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or plurality of data networks, often including the Internet. Client machines located in the cloud 904 may communicate with the on-demand service environment to access services provided by the on-demand service environment. For example, client machines may access the on-demand service environment to retrieve, store, edit, and/or process information.

In some embodiments, the edge routers 908 and 912 route packets between the cloud 904 and other components of the on-demand service environment 900. The edge routers 908 and 912 may employ the Border Gateway Protocol (BGP). The BGP is the core routing protocol of the Internet. The edge routers 908 and 912 may maintain a table of IP networks or 'prefixes' which designate network reachability among autonomous systems on the Internet.

In one or more embodiments, the firewall 916 may protect the inner components of the on-demand service environment 900 from Internet traffic. The firewall 916 may block, permit, or deny access to the inner components of the on-demand service environment 900 based upon a set of rules and other criteria. The firewall 916 may act as one or more of a packet filter, an application gateway, a stateful filter, a proxy server, or any other type of firewall.

In some embodiments, the core switches 920 and 924 are high-capacity switches that transfer packets within the on-demand service environment 900. The core switches 920 and 924 may be configured as network bridges that quickly route data between different components within the on-demand service environment. In some embodiments, the use of two or more core switches 920 and 924 may provide redundancy and/or reduced latency.

In some embodiments, the pods 940 and 944 may perform the core data processing and service functions provided by the on-demand service environment. Each pod may include various types of hardware and/or software computing resources. An example of the pod architecture is discussed in greater detail with reference to FIG. 9B.

In some embodiments, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some embodiments, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some embodiments, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some embodiments, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some embodiments, communication with the database storage system 956 may be conducted via the database switch 952. The multi-tenant database system 956 may include more than one hardware and/or software components for handling database queries. Accordingly, the database switch 952 may direct database queries transmitted by other components of the on-demand service environment (e.g., the pods 940 and 944) to the correct components within the database storage system 956.

In some embodiments, the database storage system 956 is an on-demand database system shared by many different organizations. The on-demand database system may employ a multi-tenant approach, a virtualized approach, or any other type of database approach. An on-demand database system is discussed in greater detail with reference to FIGS. 10 and 11.

In some embodiments, a request for a component may be routed from a client machine located in the cloud 904 through the on-demand service environment 900 to one of the pods, such as pod 940. The pod 940 may create the component according to the techniques described herein. In order to retrieve information necessary to create the requested component, the pod 940 may communicate with the database storage 956 through the on-demand service environment 900. Once the requested component is completed, the pod 940 may transmit a response to the client machine back through the on-demand service environment 900 to the client machine located in the cloud 904.

FIG. 9B shows a system diagram illustrating the architecture of the pod 944, in accordance with one embodiment. The pod 944 may be used to render services to a user of the on-demand service environment 900.

In some embodiments, each pod may include a variety of servers and/or other systems. The pod 944 includes one or more content batch servers 964, content search servers 968, query servers 972, file force servers 976, access control system (ACS) servers 980, batch servers 984, and app servers 988. Also, the pod 944 includes database instances 990, quick file systems (QFS) 992, and indexers 994. In one or more embodiments, some or all communication between the servers in the pod 944 may be transmitted via the switch 936.

In some embodiments, the application servers 988 may include a hardware and/or software framework dedicated to the execution of procedures (e.g., programs, routines, scripts) for supporting the construction of applications provided by the on-demand service environment 900 via the pod 944. Some such procedures may include operations for providing the services described herein. For example, the application servers 988 may receive a request for a component, perform one or more processing operations, and return data for generating the component to a client machine. The methods and systems described herein for providing components may use existing infrastructure on the application servers 988 or on other illustrated devices as appropriate.

The content batch servers 964 may requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand service environment.

The Fileforce servers 976 may manage requests information stored in the Fileforce storage 978. The Fileforce storage 978 may store information such as documents, images, and basic large objects (BLOBs). By managing requests for information using the Fileforce servers 976, the image footprint on the database may be reduced.

The query servers 972 may be used to retrieve information from one or more file systems. For example, the query system 972 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may require various hardware and/or software resources. In some embodiments, the ACS servers 980 may control access to data, hardware resources, or software resources.

In some embodiments, the batch servers 984 may process batch jobs, which are used to run tasks at specified times. Thus, the batch servers 984 may transmit instructions to other servers, such as the app servers 988, to trigger the batch jobs.

In some embodiments, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some embodiments, one or more query servers 972 may communicate with the NFS 996 to retrieve and/or update information stored outside of the pod 944. The NFS 996 may allow servers located in the pod 944 to access information to access files over a network in a manner similar to how local storage is accessed.

In some embodiments, queries from the query servers 922 may be transmitted to the NFS 996 via the load balancer 920, which may distribute resource requests over various resources available in the on-demand service environment. The NFS 996 may also communicate with the QFS 992 to update the information stored on the NFS 996 and/or to provide information to the QFS 992 for use by servers located within the pod 944.

In some embodiments, the pod may include one or more database instances 990. The database instance 990 may transmit information to the QFS 992. When information is transmitted to the QFS, it may be available for use by servers within the pod 944 without requiring an additional database call.

In some embodiments, database information may be transmitted to the indexer 994. Indexer 994 may provide an index of information available in the database 990 and/or QFS 992. The index information may be provided to file force servers 976 and/or the QFS 992.

Figure 10:
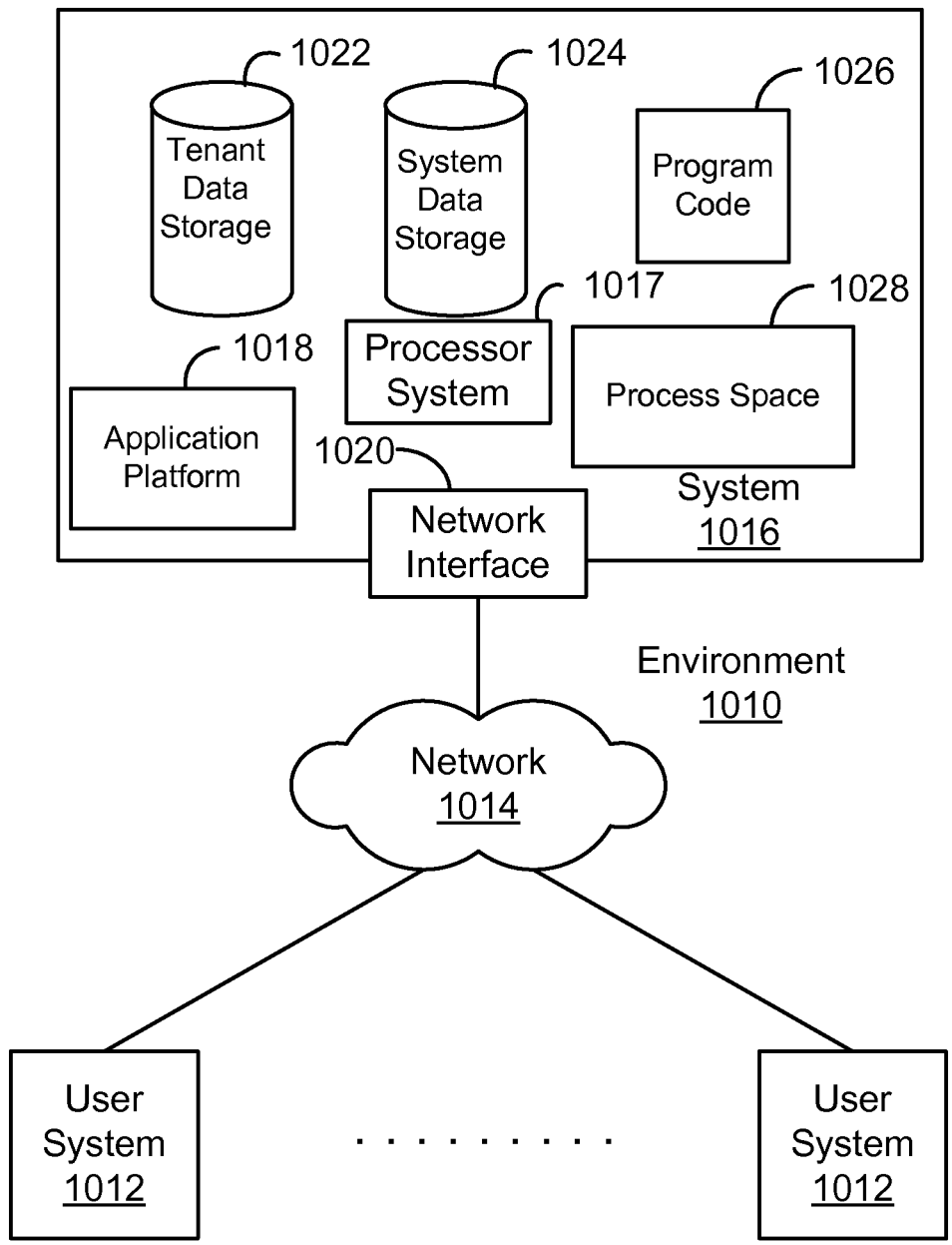
FIG. 10 is a system diagram that illustrates the architecture of a multi-tenant database environment, according to one example.

FIG. 10 shows a block diagram of an environment 1010 wherein an on-demand database service might be used, in accordance with one embodiment.

Figure 11:
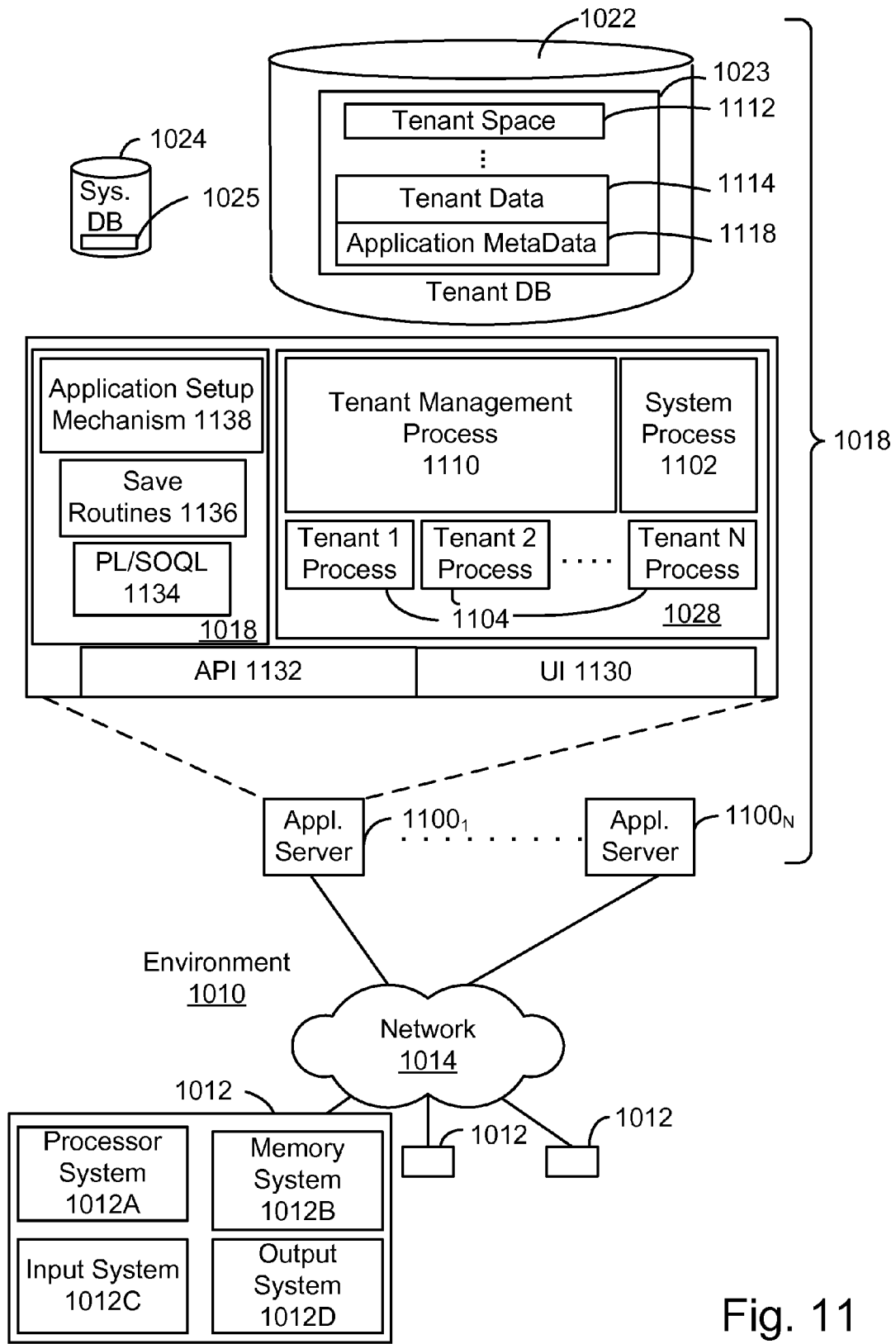
FIG. 11 is a system diagram that illustrates examples of additional components of a multi-tenant database environment.

Environment 1010 includes an on-demand database service 1016. User system 1012 may be any machine or system that is used by a user to access a database user system. For example, any of user systems 1012 can be a handheld computing device, a mobile phone, a laptop computer, a work station, and/or a network of computing devices. As illustrated in FIGS. 10 and 11, user systems 1012 might interact via a network 1014 with the on-demand database service 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" will be used interchangeably herein. A database image may include one or more database objects. A relational database management system (RDBMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

One arrangement for elements of system 1016 is shown in FIG. 10, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

The users of user systems 1012 may differ in their respective capacities, and the capacity of a particular user system 1012 might be entirely determined by permissions (permission levels) for the current user. For example, where a call center agent is using a particular user system 1012 to interact with system 1016, the user system 1012 has the capacities allotted to that call center agent. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10, implements a web-based customer relationship management (CRM) system. For example, in one embodiment, system 1016 includes application servers configured to implement and execute CRM software applications as well as provide related data, code, forms, web pages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications. User (or third party developer) applications, which may or may not include CRM, may be supported by the application platform 1018, which manages creation, storage of the applications into one or more database objects and executing of the applications in a virtual machine in the process space of the system 1016.

Each user system 1012 could include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1012 to access, process and view information, pages and applications available to it from system 1016 over network 1014.

Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 1016 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 1016 is configured to provide web pages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

Components provided to client machines according to techniques described herein may include components developed by the proprietors of the on-demand service environment, by the tenant to which the component is provided, and/or by other tenant in the on-demand service environment.

For example, a component may be developed as part of a product or package developed by the proprietor of the on-demand service environment. The produce or package may then be made available to one or more of the tenants. In this case, the component definition and other information regarding the component that is not specific to a particular tenant may be stored in the system data storage 1024 and/or the program code 1026, while tenant-specific information relating to the component may be stored in tenant data storage 1022.

As another example, a component may be developed by one of the tenants of the on-demand service environment. In this case, the component definition and other component information may be stored in the tenant data storage 1022. Further details regarding the management of tenant data are discussed with reference to FIG. 11.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 11 also shows a block diagram of environment 1010 further illustrating system 1016 and various interconnections, in accordance with one embodiment. FIG. 11 shows that user system 1012 may include processor system 1012A, memory system 1012B, input system 1012C, and output system 1012D. FIG. 11 shows network 1014 and system 1016. FIG. 11 also shows that system 1016 may include tenant data storage 1022, tenant data 1023, system data storage 1024, system data 1025, User Interface (UI) 1130, Application Program Interface (API) 1132, PL/SOQL 1134, save routines 1136, application setup mechanism 1138, applications servers 11001-1100N, system process space 1102, tenant process spaces 1104, tenant management process space 1110, tenant storage area 1112, user storage 1114, and application metadata 1116. In other embodiments, environment 1010 may not have the same elements as those listed above and/or may have other elements instead of, or in addition to, those listed above.

User system 1012, network 1014, system 1016, tenant data storage 1022, and system data storage 1024 were discussed above in FIG. 10. Regarding user system 1012, processor system 1012A may be any combination of processors. Memory system 1012B may be any combination of one or more memory devices, short term, and/or long term memory. Input system 1012C may be any combination of input devices, such as keyboards, mice, trackballs, scanners, cameras, and/or interfaces to networks. Output system 1012D may be any combination of output devices, such as monitors, printers, and/or interfaces to networks. As shown by FIG. 11, system 1016 may include a network interface 1020 (of FIG. 10) implemented as a set of HTTP application servers 1100, an application platform 1018, tenant data storage 1022, and system data storage 1024. Also shown is system process space 1102, including individual tenant process spaces 1104 and a tenant management process space 1110. Each application server 1100 may be configured to tenant data storage 1022 and the tenant data 1023 therein, and system data storage 1024 and the system data 1025 therein to serve requests of user systems 1012. The tenant data 1023 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1130 provides a user interface and an API 1132 provides an application programmer interface to system 1016 resident processes to users and/or developers at user systems 1012. The tenant data and the system data may be stored in various databases, such as Oracle™ databases.

Application platform 1018 includes an application setup mechanism 1138 that supports application developers' creation and management of applications, which may be saved as metadata into tenant data storage 1022 by save routines 1136 for execution by subscribers as tenant process spaces 1104 managed by tenant management process 1110 for example. Invocations to such applications may be coded using PL/SOQL 34 that provides a programming language style interface extension to API 1132. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1116 for the subscriber making the invocation and executing the metadata as an application in a virtual machine.

Each application server 1100 may be communicably coupled to database systems, e.g., having access to system data 1025 and tenant data 1023, via a different network connection. For example, one application server 11001 might be coupled via the network 1014 (e.g., the Internet), another application server 1100N-1 might be coupled via a direct network link, and another application server 1100N might be coupled by yet a different network connection. Transfer Control Protocol and Internet Protocol (TCP/IP) are typical protocols for communicating between application servers 1100 and the database system. However, other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In one embodiment, therefore, an interface system implementing a load balancing function (e.g., an F5 Big-IP load balancer) is communicably coupled between the application servers 1100 and the user systems 1012 to distribute requests to the application servers 1100. In one embodiment, the load balancer uses a least connections algorithm to route user requests to the application servers 1100. Other examples of load balancing algorithms, such as round robin and observed response time, also can be used. For example, in certain embodiments, three consecutive requests from the same user could hit three different application servers 1100, and three requests from different users could hit the same application server 1100. In this manner, system 1016 is multitenant, wherein system 1016 handles storage of, and access to, different objects, data and applications across disparate users and organizations.

As an example of storage, one tenant might be a company that employs a sales force where each call center agent uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client machines/systems) communicate with application servers 1100 to request and update system-level and tenant-level data from system 1016 that may require sending one or more queries to tenant data storage 1022 and/or system data storage 1024. System 1016 (e.g., an application server 1100 in system 1016) automatically generates one or more SQL statements (e.g., SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

We claim:

1. A method for providing a user interface in an on-demand service environment, the method comprising:
    receiving, by a processor system, a first indication of a component definition to instantiate, the component definition comprising a portion of a component definition data structure;
    instantiating, by the processor system, a provided component in accordance with the component definition;
    instantiating, by the processor system, attributes of the component definition data structure to produce a component instance tree data structure;
    determining, by the processor system, that an attribute of an object of the component instance tree data structure indicates a designated one of a plurality of serialization methods, the object being a root object instance at a first level of a hierarchy of the component instance tree data structure;
    serializing, by the processor system, the component according to the designated serialization method, serializing the component including serializing the object and a child object, the child object at a second level of the hierarchy of the component instance tree data structure, the second level being lower than the first level;
    generating, by the processor system, a reference identifier associated with the serialized component;
    transmitting, to a client device, the serialized component and the reference identifier, the serialized component comprising a version of the component instance tree data structure, and the serialized component allowing the client device to create an instance of the component in memory;
    receiving, by the processor system, a second indication of a component definition to instantiate;
    determining, by the processor system, that the second indication is associated with the component definition of the first indication and that the serialized component has been transmitted to the client device; and
    transmitting, to the client device, the reference identifier associated with the serialized component responsive to the determination that the serialized component has been transmitted to the client device.

2. The method of claim 1, wherein the on-demand service environment includes a multi-tenant database accessible to a plurality of tenants, and wherein the first client device is associated with one of the tenants.

3. The method of claim 1, wherein instantiating the attributes of the component definition tree data structure comprises recursively traversing the component definition tree data structure.

4. The method of claim 1, further comprising:
    determining that the component definition indicates a non-concrete component type;
    locating a provider for the non-concrete component type; and
    invoking the provider to determine a provided component to instantiate from the non-concrete component type.

5. The method of claim 4, wherein the non-concrete component type comprises an abstract component type or an interface.

6. The method of claim 4, wherein the provided component is instantiated whether the provided component is a concrete component type or a non-concrete component type.

7. The method of claim 4, wherein the locating process comprises searching for a provider definition in a metadata tree.

8. The method of claim 5, further comprising determining whether the provided component extends the abstract component or implements the interface.

9. An apparatus for providing a user interface in an on-demand service environment, the apparatus comprising:
    a network interface; and
    a processor system comprising at least one processor, the processor system configured for:
        receiving a first indication of a component definition to instantiate, the component definition comprising a portion of a component definition data structure;
        instantiating a component in accordance with the component definition;

instantiating attributes of the component definition data structure to produce a component instance tree data structure comprising at least one expression or formula;

determining that an attribute of an object of the component instance tree data structure indicates a designated one of a plurality of serialization methods, the object being a root object instance at a first level of a hierarchy of the component instance tree data structure;

serializing the component according to the designated serialization method, serializing the component including serializing the object and a child object, the child object at a second level of the hierarchy of the component instance tree data structure, the second level being lower than the first level;

generating a reference identifier associated with the serialized component;

transmitting, to a client device, the serialized representation of the component and the reference identifier, the serialized component comprising a version of the component instance tree data structure, and the serialized component allowing the client device to create an instance of the component in memory;

receiving a second indication of a component definition to instantiate;

determining that the second indication is associated with the component definition of the first indication and that the serialized component has been transmitted to the client device; and transmitting, to the client device, the reference identifier associated with the serialized component responsive to the determination that the serialized component has been transmitted to the client device.

10. The apparatus of claim 9, wherein the on-demand service environment includes a multi-tenant database accessible to a plurality of tenants, and wherein the first client device is associated with one of the plurality of tenants.

11. The apparatus of claim 9, wherein instantiating the attributes of the component definition tree data structure comprises recursively traversing the component definition tree data structure.

12. The apparatus of claim 9, wherein the processor system is further configured to perform the following operations:

determining that the component definition indicates a non-concrete component type;

locating a provider for the non-concrete component type; and invoking the provider to determine a provided component to instantiate from the non-concrete component type.

13. The apparatus of claim 9, wherein the processor system is further configured for performing a type checking operation on at least some instantiated attributes.

14. The apparatus of claim 12, wherein the non-concrete component type comprises an abstract component type or an interface.

15. The apparatus of claim 12, wherein the processor system is further configured to instantiate the provided component whether the provided component is a concrete component type or a non-concrete component type.

16. The apparatus of claim 12, wherein the locating process comprises searching for a provider definition in a metadata tree.

17. The apparatus of claim 13, wherein the type checking operation is performed, at least in part, based on a language of the component model.

18. The apparatus of claim 14, wherein the processor system is further configured for determining whether the provided component extends the abstract component or implements the interface.

19. A machine-readable medium carrying one or more sequences of instructions for providing a user interface in an on-demand service environment, which instructions, when executed by one or more processors, cause the one or more processors to carry out the following processes:

receiving a first indication of a component definition to instantiate, the component definition comprising a portion of a component definition data structure;

instantiating a component in accordance with the component definition;

instantiating attributes of the component definition data structure to produce a component instance tree data structure;

determining that an attribute of an object of the component instance tree data structure indicates a designated one of a plurality of serialization methods, the object being a root object instance at a first level of a hierarchy of the component instance tree data structure;

serializing the component according to the designated serialization method, serializing the component including serializing the object and a child object, the child object at a second level of the hierarchy of the component instance tree data structure, the second level being lower than the first level;

generating a reference identifier associated with the serialized component;

transmitting, to a client device, the serialized component and the reference identifier, the serialized component comprising a version of the component instance tree data structure, the serialized component allowing the client device to create an instance of the component in memory;

receiving a second indication of a component definition to instantiate;

determining that the second indication is associated with the component definition of the first indication and that the serialized component has been transmitted to the client device; and transmitting, to the client device, the reference identifier associated with the serialized component responsive to the determination that the serialized component has been transmitted to the client device.

20. The machine-readable medium of claim 19, wherein the on-demand service environment includes a multi-tenant database accessible to a plurality of tenants, and wherein the first client device is associated with one of the plurality of tenants.

21. The machine-readable medium of claim 19, further comprising instructions for causing the one or more processors to carry out the following processes:

determining that the component definition indicates a non-concrete component type;

locating a provider for the non-concrete component type; and invoking the provider to determine a provided component to instantiate from the non-concrete component type.

22. The machine-readable medium of claim 21, further comprising instructions for causing the one or more processors to instantiate the provided component whether the provided component is a concrete component type or a non-concrete component type.

* * * * *